(12) United States Patent
Hu

(10) Patent No.: US 7,806,102 B2
(45) Date of Patent: Oct. 5, 2010

(54) VARIABLE COORDINATION VOLUME TYPE EIGHT-STROKE ENGINE

(76) Inventor: Lung-tan Hu, 25755 48th Avenue, Aldergrove, British Columbia (CA) V4W 1J6

( * ) Notice: Subject to any disclaimer, the term of this patent is extended or adjusted under 35 U.S.C. 154(b) by 0 days.

(21) Appl. No.: 12/586,636

(22) Filed: Sep. 25, 2009

(65) Prior Publication Data

US 2010/0012058 A1    Jan. 21, 2010

Related U.S. Application Data

(63) Continuation-in-part of application No. 10/619,147, filed on Jul. 15, 2003, now Pat. No. 6,918,358.

(51) Int. Cl.
*F02B 75/02* (2006.01)
(52) U.S. Cl. .............. 123/316; 123/48 AA; 123/78 AA
(58) Field of Classification Search ................. 123/311, 123/316, 48 R, 48 A, 48 AA, 78 R, 78 A, 123/78 AA; 60/597
See application file for complete search history.

(56) References Cited

U.S. PATENT DOCUMENTS 6,698,405 B2 *    3/2004    Bigi ........................... 123/560

* cited by examiner

*Primary Examiner*—Noah Kamen

(57) ABSTRACT

The present invention provides a variable coordination volume type eight-stroke engine for increasing the fuel efficiency in the heavy load operation by regulating the maximum air-pressure in the charge-coordinate-channel and adjusting the initiation timing of the injection-process as the engine load changes; wherein the maximum air-pressure of the charge-coordinate-channel will be regulated with a buffer piston in the range of 25% to 75% of the concurrent maximum combustion pressure of the mastery cylinder.

In addition the overall temperature of the master cylinder and the slave cylinder will be reduced in the heavy load condition by injecting a flow of high-density-air at lower temperature in the heavy load operation, thereby achieving better durability and higher fuel efficiency.

20 Claims, 20 Drawing Sheets

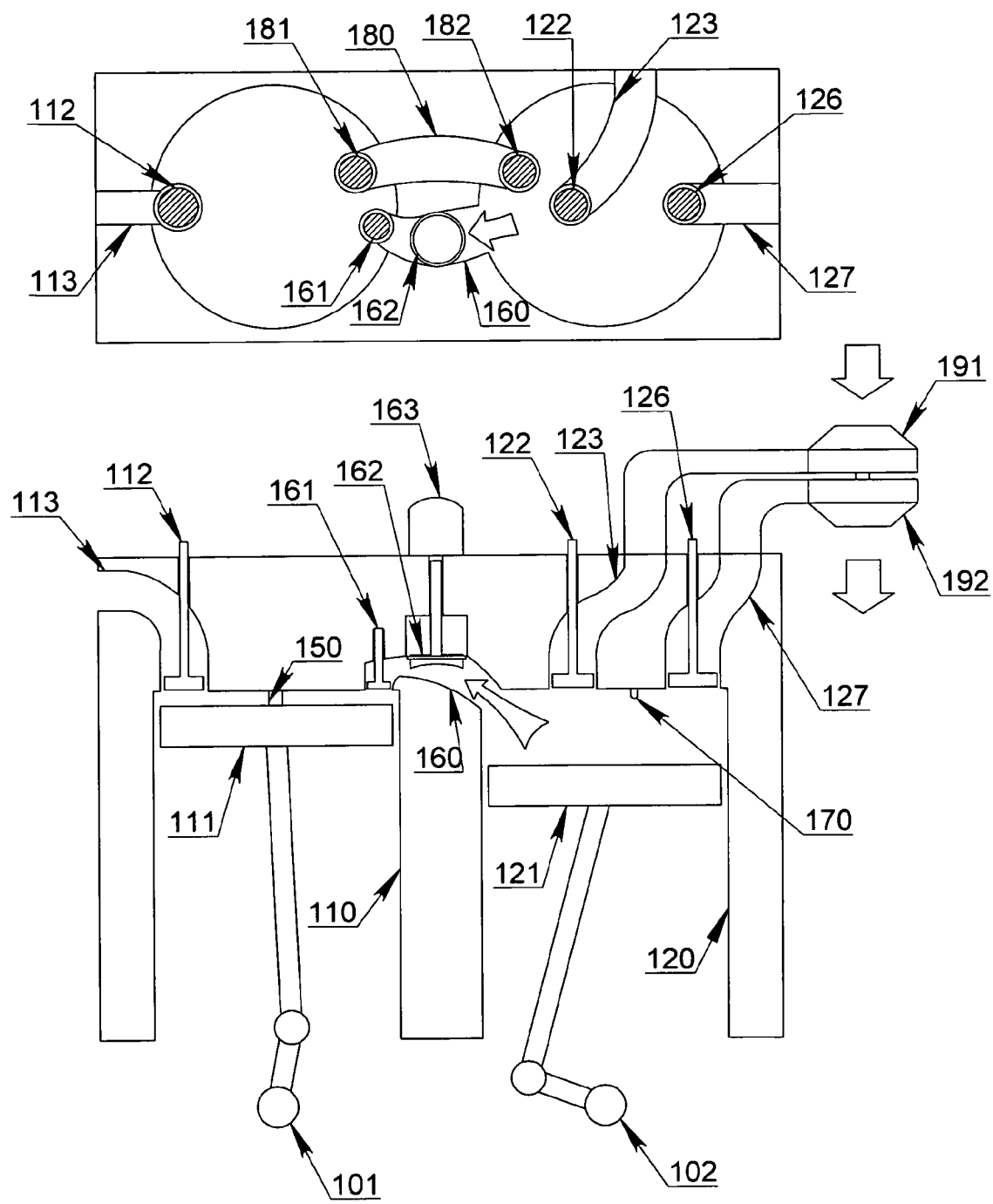
FIG.1.Light

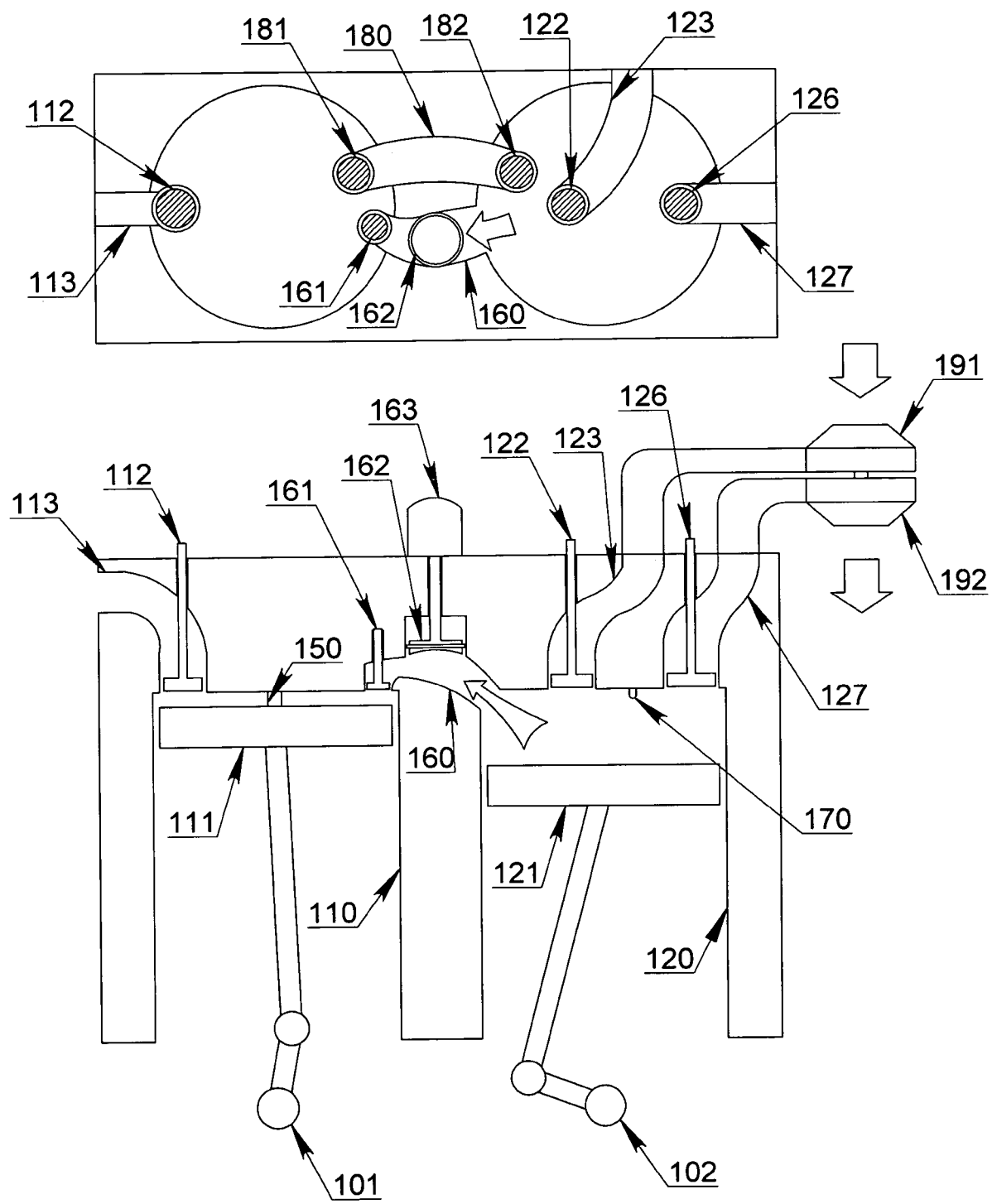
FIG.1.Medium

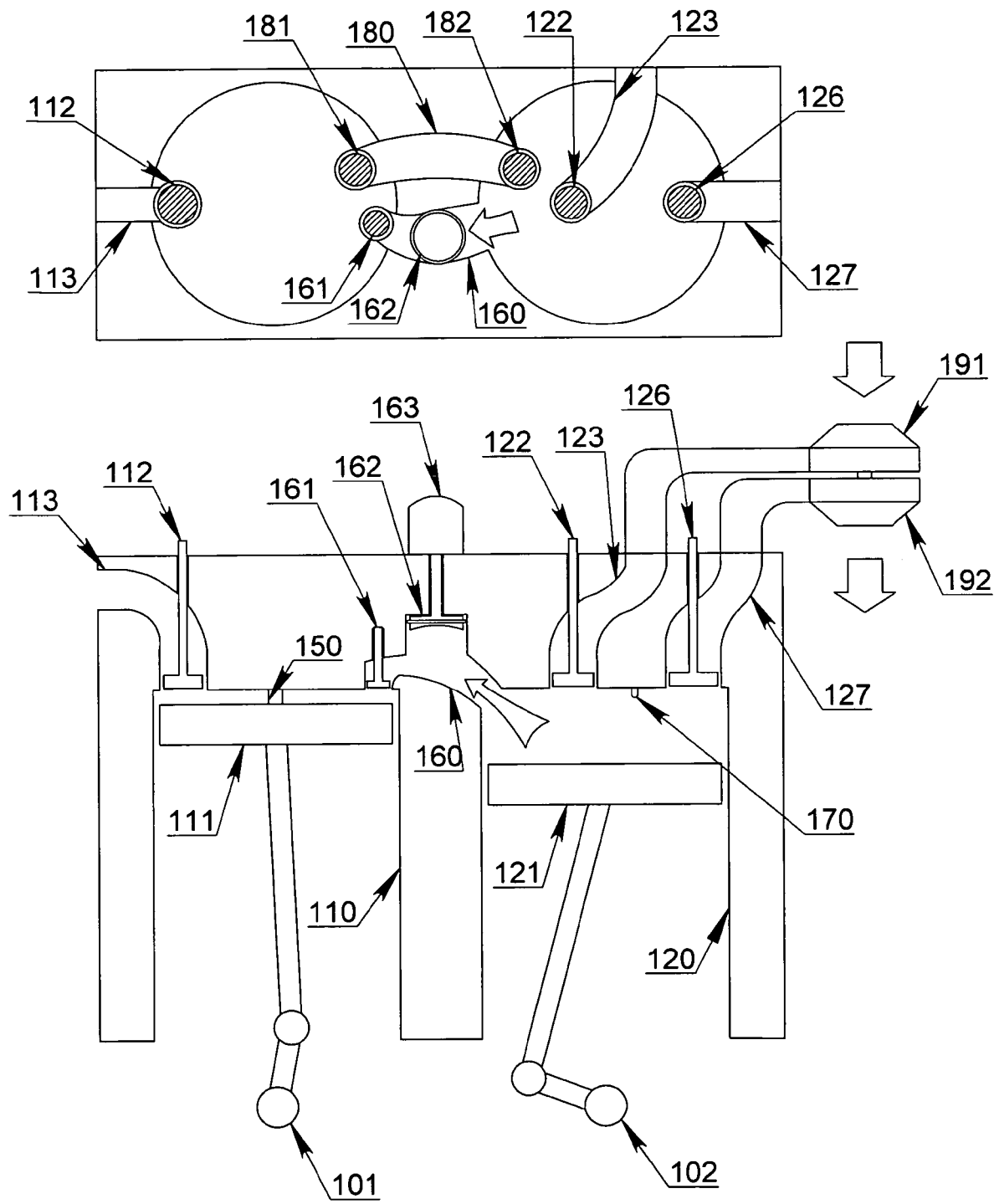
FIG.1.Heavy

FIG.5 A-type eight-stroke engine

US 7,806,102 B2

VARIABLE COORDINATION VOLUME TYPE EIGHT-STROKE ENGINE

RELATED APPLICATION

This patent application is a continuation-in-part application of and claims priority from U.S. application Ser. No. 10/619,147, filed Jul. 15, 2003 now U.S. Pat No. 6,918,358.

FIELD OF THE INVENTION

The present invention relates to a variable coordination volume type eight-stroke engine; and more particularly to the improvements on the coordination system of the eight-stroke engine.

The present invention is a continuing application of the eight-stroke internal combustion engine (filed on Jul. 15, 2003 with application number 10/619,147).

The present invention can be used in the field of transportation vehicle, power generation.

BACKGROUND OF THE INVENTION

The present invention is a continuing application of the eight-stroke internal combustion engine, which was filed as U.S. Pat. No. 6,918,358 (application Ser. No. 10/619,147), and the engine of this type can also be abbreviated as the eight-stroke engine.

The fuel efficiency of the eight-stroke engine is relatively higher than the conventional four-stroke engine (over 35% for gasoline type eight-stroke engine and 45% for diesel type eight-stroke engine) under the condition that the engine load remains within the designated load condition.

However, unlike conventional engines, the eight-stroke engine requires to adjust the initiation timing of the injection-process (the process to inject a flow of high-density-air into the master cylinder) as the load changes, otherwise, the power-to-weight ratio will significantly decrease due to the compression energy loss and the heat loss during the slave-compression-process in the heavy load condition.

Therefore the main objective of the present invention is to provide an improved eight-stroke engine capable of adjusting the initiation timing and regulating the maximum compression pressure according to the engine load condition.

SUMMARY OF THE INVENTION

It is the main objective of the present invention to provide a variable coordination volume type eight-stroke engine capable of adjusting the initiation timing of the injection-process to increase the fuel efficiency in the heavy load condition.

It is the second objective of the present invention to provide a variable coordination volume type eight-stroke engine capable of regulating the maximum compression pressure of the charge-coordinate-channel within 25% to 75% of the maximum concurrent combustion pressure of the master cylinder.

BRIEF DESCRIPTION OF THE DRAWINGS

FIG. 1A shows the beginning of the master-intake-process at about 30 degree of crankshaft reference angle, wherein the master-intake-valve is opened to admit air into the master cylinder, the slave-exhaust-valve is opened to expel the cold-expansion-medium out of the slave cylinder from the last slave-exhaust-process.

FIG. 1B shows the beginning of the slave-intake-process at about 110 degree of crankshaft reference angle, wherein the slave-intake-valve is opened to admit a flow of pressurized air into the slave cylinder from the turbocharger, the master cylinder is in the later stage of the master-intake-process.

FIG. 1C shows the beginning of the master-compression-process at about 210 degree of crankshaft reference angle, wherein the master piston is compressing the air in the master cylinder, the slave cylinder is in the later stage of the slave-compression-process.

FIG. 1D shows the beginning of the slave-compression-process at about 290 degree of crankshaft reference angle, wherein the slave piston is compressing the air of the slave cylinder into the charge-coordinate-channel.

FIG. 1E shows the beginning of the hot-combustion-process at about 370 degree of crankshaft reference angle, wherein an air-fuel mixture is combusting in the master cylinder to form a hot-combustion-medium, the air-pressure of the charge-coordinate-channel is still increasing until the end of the hot-combustion-process.

FIG. 1F shows the beginning of the injection-process at about 410 degree of crankshaft reference angle, wherein a flow of high-density-air is injected from the charge-coordinate-channel into the master cylinder to mix with the hot-combustion-medium, thereby forming a cold-expansion-medium in the master cylinder during this process.

FIG. 1G shows the beginning of the cold-expansion-process at about 470 degree of crankshaft reference angle, wherein the cold-expansion-medium will expand in both the master cylinder and the slave cylinder, the cold-expansion-medium of the master cylinder is transferred to the slave cylinder through the reverse-channel.

FIG. 1H shows the beginning of the slave-exhaust-process at about 560 degree of crankshaft reference angle, wherein the slave-exhaust-valve is opened to expel the cold-expansion-medium through the slave-exhaust-port, and the cold-expansion-medium is charged into the turbine of the turbocharger.

FIG. 1.L*ight* shows position of the buffer piston in the light load operation, wherein the buffer piston lowers its position to decrease the effective volume in the charge-coordinate-channel, thereby setting the initiation point of the injection-process to about 390 degree of crankshaft reference angle as in Operation Table.1L.

FIG. 1.M*edium* shows position of the buffer piston in the medium load operation, wherein the effective volume in the charge-coordinate-channel is adjusted with the buffer piston, so that the initiation point of the injection-process is set to about 410 degree of crankshaft reference angle as in Operation Table.1M.

FIG. 1.H*eavy* shows position of the buffer piston in the heavy load operation, wherein the buffer piston raises its position to increase the effective volume in the charge-coordinate-channel, thereby setting the initiation point of the injection-process to about 420 degree of crankshaft reference angle as in Operation Table.1H.

FIG. 2A shows the second embodiment at the beginning of the slave-compression-process at about 260 degree of crankshaft reference angle, wherein the spring-buffer-piston is at its lowest position.

FIG. 2B shows the second embodiment in the middle of the slave-compression-process at about 340 degree of crankshaft reference angle, wherein the spring-buffer-piston is being pushed up with the compressed air of the slave cylinder.

FIG. 2C shows the second embodiment at the end of the slave-compression-process at about 410 degree of crankshaft reference angle, wherein the spring-buffer-piston is pushed being up to adjust the effective volume in the charge-coordinate-channel, and the injection-process is about to start by opening the charge-coordinate-valve.

FIG. 2D shows the second embodiment near the end of the injection-process at about 440 degree of crankshaft reference angle, wherein the spring-buffer-piston is oscillated down with the spring tension after most of the high-density-air of the charge-coordinate-channel has been injected into the master cylinder.

Figure 1A:
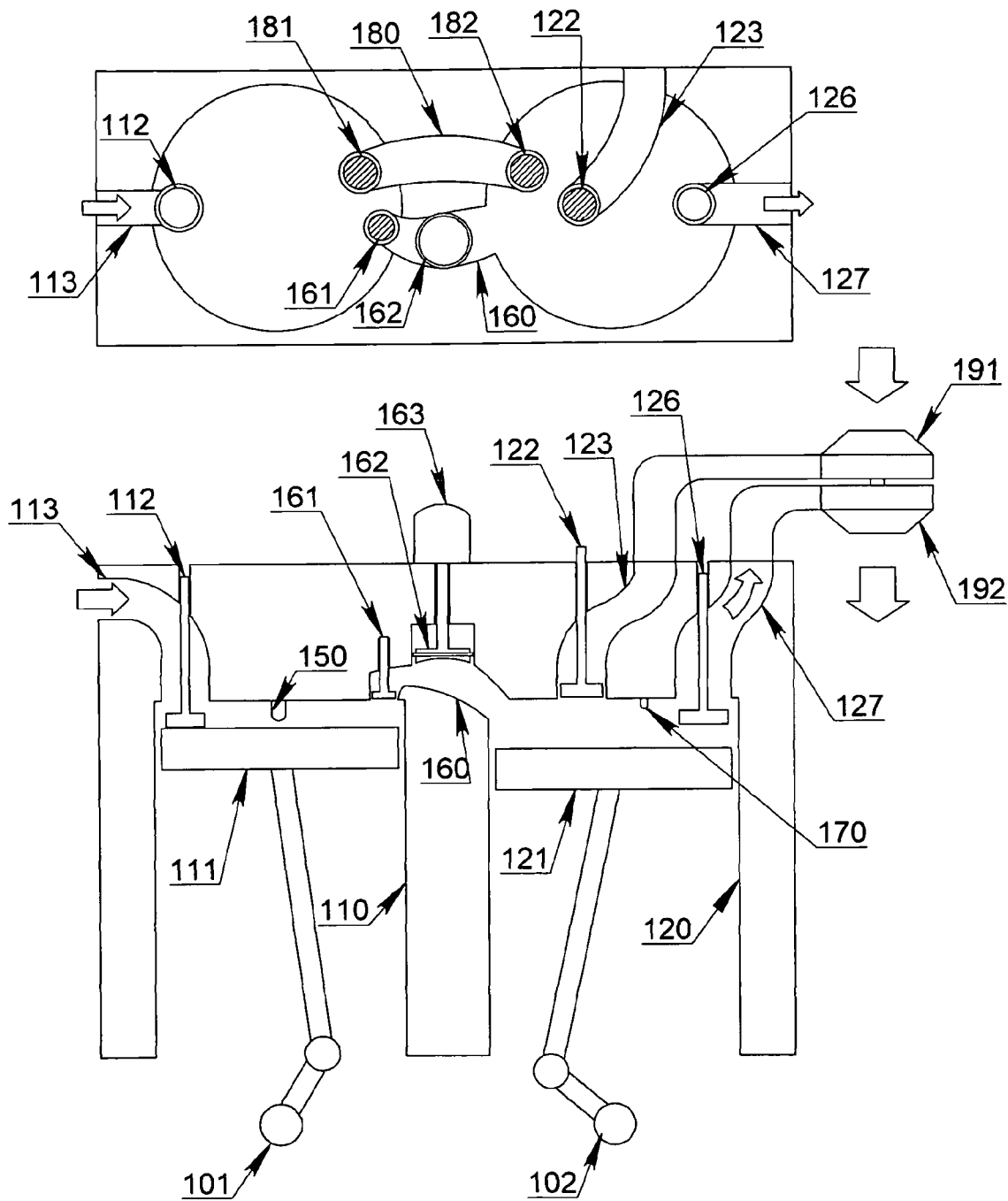
FIG. 1A to FIG. 1H are the illustrative views of the present invention in difference processes of the 8-process-sequence in general medium load operation, wherein the master piston and the slave piston are set at 80 degree to perform the eight-stroke-operation (the phase-difference can be constructed from 60 degree to 150 degree); a top sectional view is provided above the side sectional view for showing the detailed condition of each valve, wherein the shaded area of the valve indicates that the associated valve is at shut position.

Operation Table.1L shows the 8-process-sequence performed by the eight-stroke engine with 80 degree phase-difference in the light load condition.

Operation Table.1M shows the 8-process-sequence performed by the eight-stroke engine with 80 degree phase-difference in the medium load condition.

Operation Table.1H shows the 8-process-sequence performed by the eight-stroke engine with 80 degree phase-difference in the heavy load condition.

Operation Table.2M shows the 8-process-sequence performed by the eight-stroke engine with the phase-difference of 120 degree in the medium load condition.

DETAILED DESCRIPTION OF THE PREFERRED EMBODIMENTS

The variable coordination volume type eight-stroke engine is an improved eight-stroke engine that can perform with a relatively higher power-to-weight ratio and boarder operational range and better fuel efficiency in comparison to the original eight-stroke engine.

The eight-stroke-operation of the eight-stroke engine includes the master-intake-stroke, the slave-intake-stroke, the master-compression-stroke, the slave-compression-stroke, the master-expansion-stroke, the slave-expansion-stroke, the master-exhaust-stroke, the slave-exhaust-stroke.

The master-intake-stroke, the slave-intake-stroke, the master-expansion-stroke, the slave-expansion-stroke are down-strokes.

The master-compression-stroke, the slave-compression-stroke, the master-exhaust-stroke, the slave-exhaust-stroke are up-strokes.

As the present invention will describe the detailed air-flows in the master cylinder and slave cylinder, an 8-process-sequence is introduced to elaborate the operation of the eight-stroke engine based on the air-flows.

The 8-process-sequence consists of 8 processes, which are performed in the following order, the master-intake-process, the slave-intake-process, the master-compression-process, the slave-compression-process, the hot-combustion-process, the injection-process, the cold-expansion-process, the slave-exhaust-process.

The master cylinder includes a master piston, air-intake means, fuel-supplying-means, ignition means, a reverse-channel for providing a one-way passage from the master cylinder to the slave cylinder; wherein said reverse-channel will only be opened after the slave-compression-stroke has started.

The slave cylinder includes a slave piston, air-intake means, exhaust-means, a charge-coordinate-channel for providing an one-way passage from the slave cylinder to the master cylinder; wherein said charge-coordinate-channel will only be opened after the air-pressure of the charge-coordinate-channel has increased to higher than the pressure of the master cylinder.

Said charge-coordinate-coordinate-channel includes a movable member or a buffer piston to control the effective volume in the charge-coordinate-channel, so that the maximum compression pressure in the charge-coordinate-channel will not exceed 75% of the concurrent maximum combustion pressure of the master cylinder.

The concurrent maximum combustion pressure of the master cylinder refers to the maximum combustion pressure in that specific load condition; for example, during the light load operation with a maximum combustion pressure of 320 psi (pound per square inch) in the master cylinder at about 365 degree of crankshaft, the concurrent maximum combustion pressure is 320 psi, so the maximum compression pressure of the charge-coordinate-channel will be limited to lower than 240 psi; for another example, during the heavy load operation with a maximum combustion pressure of 700 psi in the master cylinder at about 365 degree of crankshaft reference angle, the concurrent maximum combustion pressure is 700 psi, so the maximum compression pressure of the charge-coordinate-channel will be limited lower than 525 psi.

A slave-pressure-sensor will be preferable to be installed in the slave cylinder or the charge-coordinate-channel to detect the maximum compression pressure during the slave-compression-process; for the type of the buffer piston controlled by a servo motor with the ECU (engine control unit), the slave-compression-sensor will be a basic requirement.

The master piston and the slave piston will be constructed with a phase-difference between 60 degree and 150 degree to perform the eight-stroke-operation.

Unlike the original eight-stroke engine that uses a coordinate-port and a coordinate-valve to manage the air-flows between the master cylinder and the slave cylinder, the present invention uses at least two dedicated channels (reverse-channel and charge-coordinate-channel) for each purpose, this can increase the fuel efficiency and provide better control of the initiation timing of the injection-process.

The concept of the 8-process-sequence is explained as follows:

The master-intake-process is to provide air into the master cylinder during the master-intake-stroke.

The slave-intake-process is to provide air into the slave cylinder during the slave-intake-stroke.

The master-compression-process is to compress the air in the master cylinder during the master-compression-stroke, and the fuel will be supplied into the master cylinder before the end of the master-compression-process.

The slave-compression-process is to compress the air into the charge-coordinate-channel as the high-density-air; at the end of the slave-compression-process, the air-pressure in the charge-coordinate-channel will increase to over the pressure in the master cylinder.

The hot-combustion-process is to ignite and combust the air-fuel mixture as a hot-combustion-medium in the master cylinder during the earlier portion of the master-expansion-stroke.

The fuel supplying means of the master cylinder can be a carburetor, a direction-injection-nozzle, a fuel pump (mainly for diesel), or a propane converter (for natural gas).

The injection-process is to inject the high-density-air of the charge-coordinate-channel into the master cylinder to mix with the hot-combustion-medium, wherein a cold-expansion-medium is formed in the master cylinder by the end of the injection-process.

The duration of the injection-process can vary between 5 degree and 60 degree of crankshaft rotation, the initiation timing of the injection-process can range from 30 degree after the TDC of the master-expansion-stroke and 30 degree before the TDC of the slave-compression-stroke; in other words the initiation of injection-process can occur between first 30 degree of the master-expansion-stroke to the last 30 degree of the slave-compression-process.

The earliest initiation timing of the injection-process should at least 15 degree after the hot-combustion-process is started; for example with an eight-stroke engine ignites the master cylinder at 380 degree of crankshaft reference angle (late ignition timing is common in large engine application), the earliest initiation timing of the injection-process will be shifted to 395 degree of crankshaft reference angle.

The cold-expansion-process is to expand the cold-expansion-medium in both the master cylinder and the slave cylinder during the later portion of the master-expansion-stroke, wherein the cold-expansion-medium will expand and transfer from the master cylinder into the slave cylinder through the reverse-channel.

The slave-exhaust-process is to expel the cold-expansion-medium out with the exhaust means of the slave cylinder during the slave-exhaust-stroke and the earlier portion of the slave-expansion-stroke; for high speed applications, an auxiliary exhaust valve may be installed in the master cylinder to directly expel the cold-expansion-medium out of the master cylinder during the master-exhaust-stroke, whereas, for the medium speed application with no auxiliary exhaust valve, the cold-expansion-medium of the master cylinder will be transferred to the slave cylinder through the reverse-channel by the end of the master-exhaust-stroke.

A turbocharger system is preferable to be equipped with the eight-stroke engine, wherein a compressor of the turbocharger is charging a flow of pressurized air into the slave cylinder during the slave-intake-process, the cold-expansion-medium expelled from the eight-stroke engine is charged into a turbine of the turbocharger, so that the energy recovered from the cold-expansion-medium is used to increase the intake pressure of the slave cylinder, thereby increasing the fuel efficiency to over 40%.

To further raise the fuel efficiency and prevent the pollution in the light load operation, a catalytic converter is preferable to be installed in the reverse-channel, therefore, the cold-expansion-medium will pass through the catalytic converter during the cold-expansion-process.

Now the concept and the advantages of the variable coordination volume type eight-stroke engine will be explained as follows: the variable coordination volume type eight-stroke engine will increase the volume available in the charge-coordinate-channel as the engine load increases, this can be achieved with two different control methods, and they are explained in the first embodiment and the second embodiment, wherein the first embodiment requires more precise machining and better heat-resistance material, but the first embodiment has better control over all operational load condition, the second embodiment has a low manufacturing cost but less adaptability to the load condition; wherein for the clarity purpose, both the first embodiment and the second embodiment will employ a phase-difference of 80 degree between the master piston and the slave piston.

Now referring to FIG. 1A for the first embodiment, the first embodiments includes a master cylinder 110, a slave cylinder 120, a master piston 111, a slave piston 121, master crankshaft 101, slave crankshaft 102, a master-intake-valve 112, a slave-intake-valve 122, a charge-coordinate-channel 160, a reverse-channel 180, a charge-coordinate-valve 161, a reverse-input-valve 181, a reverse-output-valve 182, a slave-exhaust-valve 126, a buffer piston 162 (also referred as a volume-control member for the ease of comprehension, various other shapes can be constructed with the same concept), a compressor of the turbocharger 191, a turbine of the turbocharger 192, a spark plug 150 (as the ignition means for the master cylinder), a slave-pressure-sensor 170, a volume-control actuator 163, an ECU (engine control unit which is shown in the drawing) for determining the required volume in the charge-coordinate-channel; wherein the charge-coordinate-valve 161 can only be actuated after the air-pressure of the charge-coordinate-channel 160 is increased to higher than the pressure in the master cylinder 110; wherein and the reverse-input-valve 181 and the reverse-output-valve 182 can only be actuated after the slave-expansion-stroke has started; wherein the compression pressure in the charge-coordinate-channel 160 will be regulated within 75% to 25% of the concurrent maximum combustion pressure of the master cylinder 110.

Figure 1B:
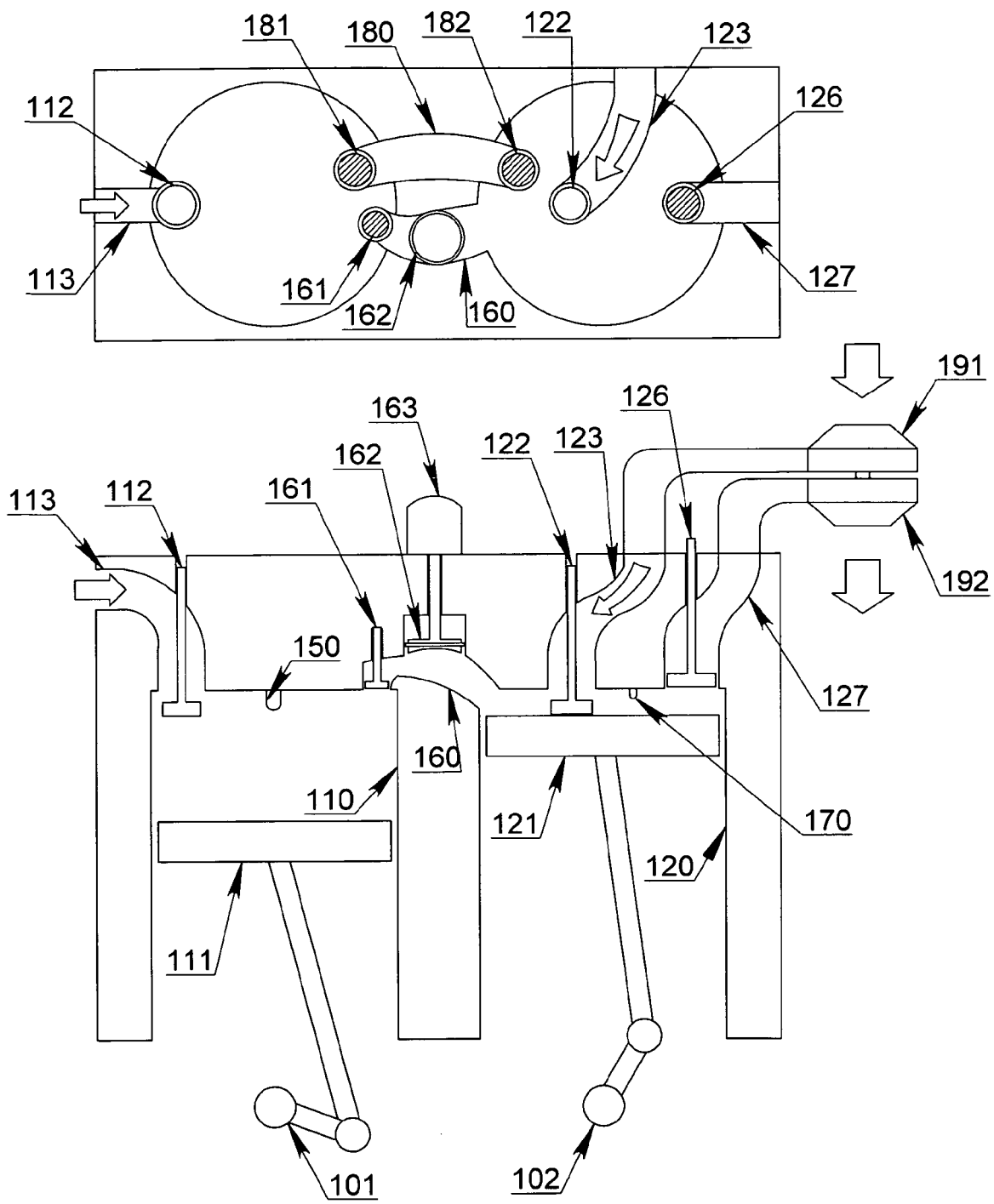
Figure 1C:
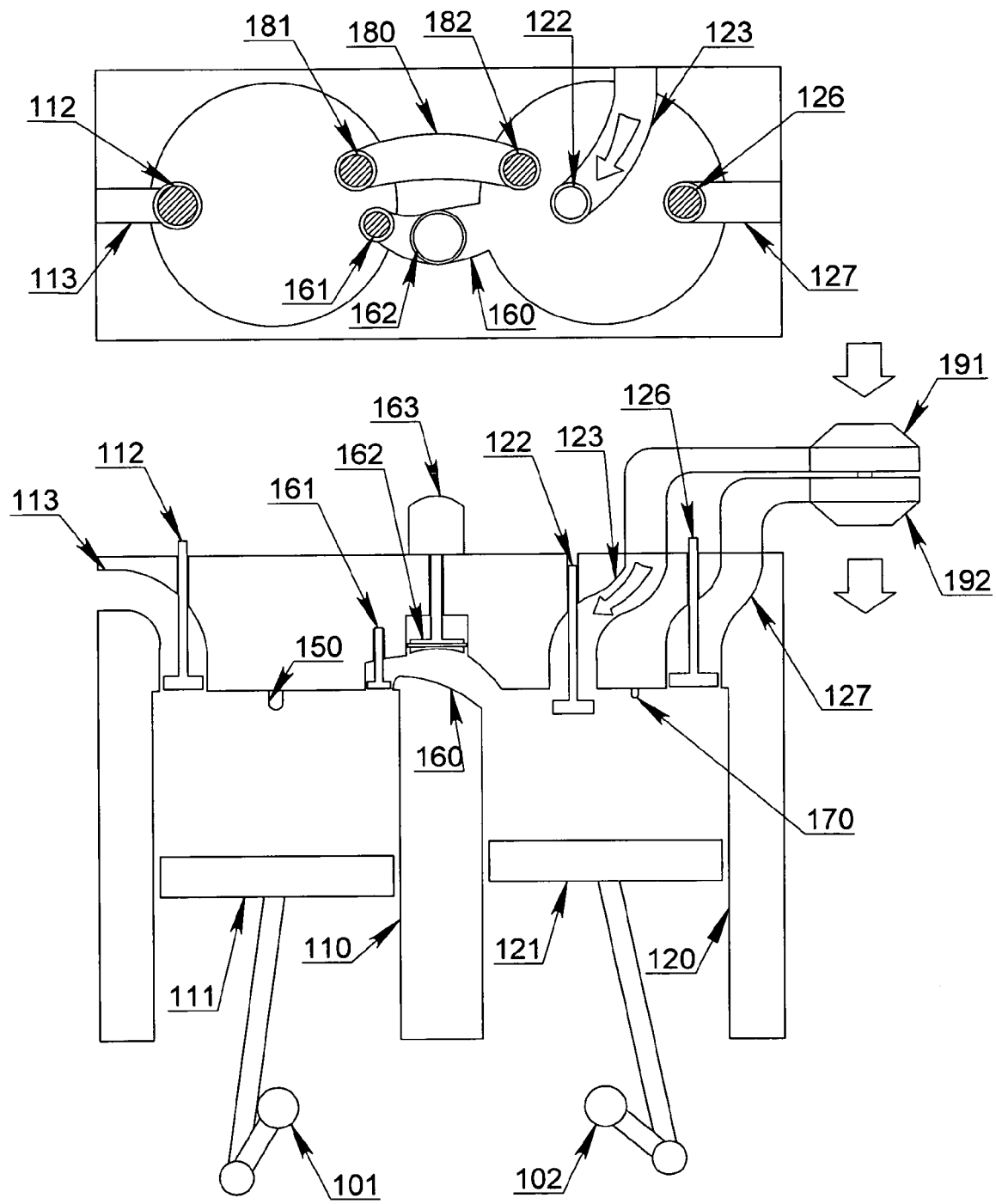
Figure 1D:
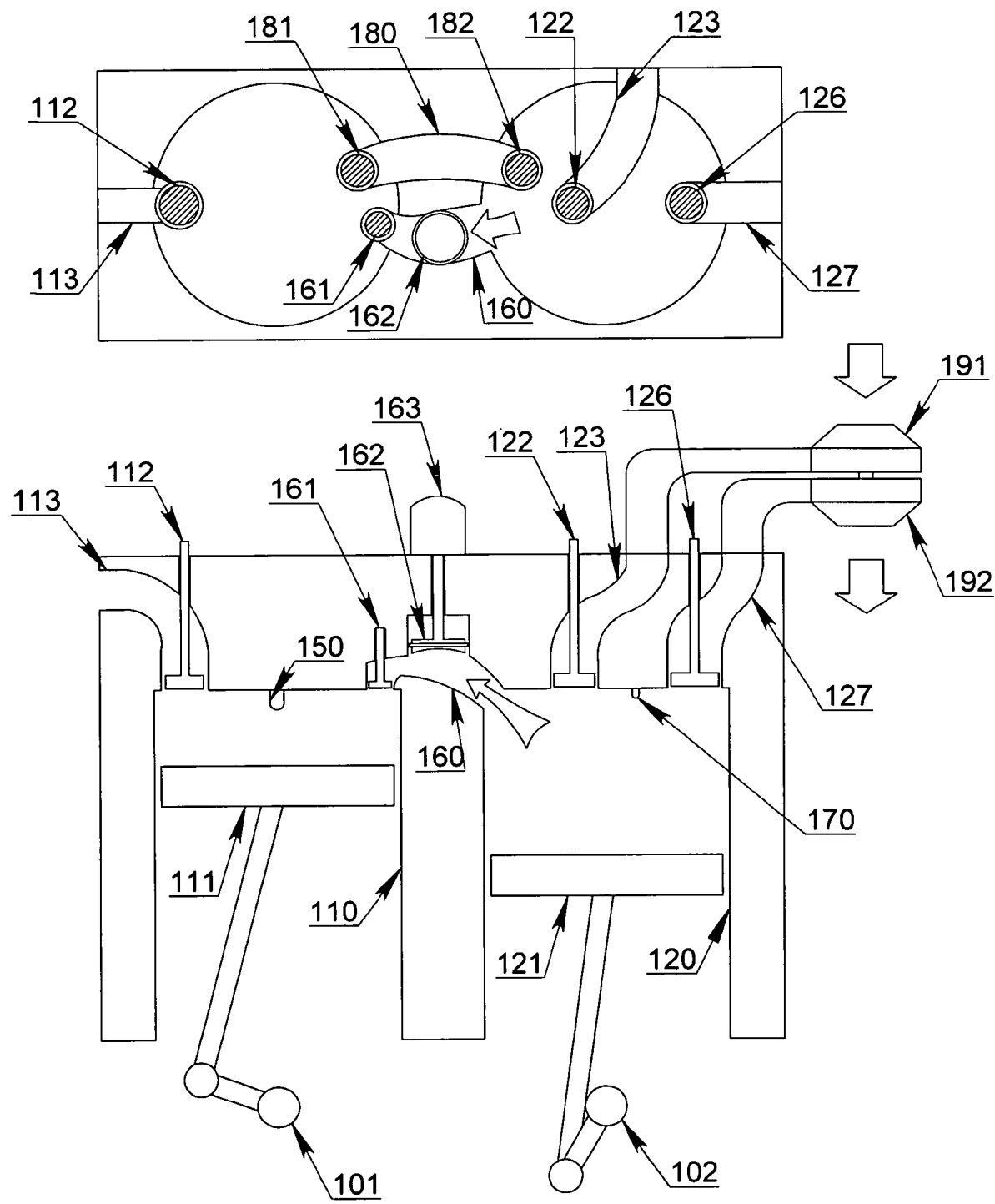
Figure 1E:
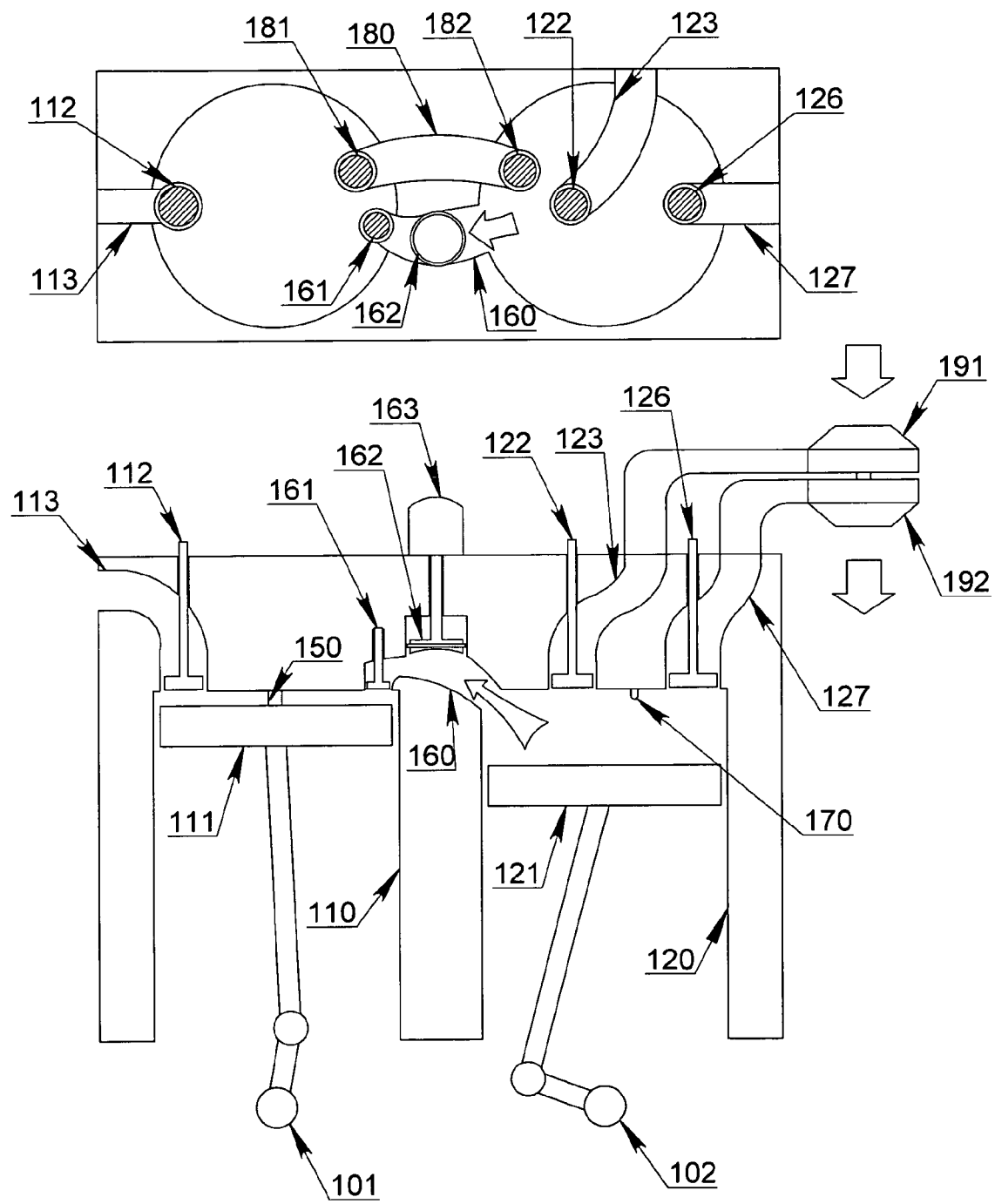
Figure 1F:
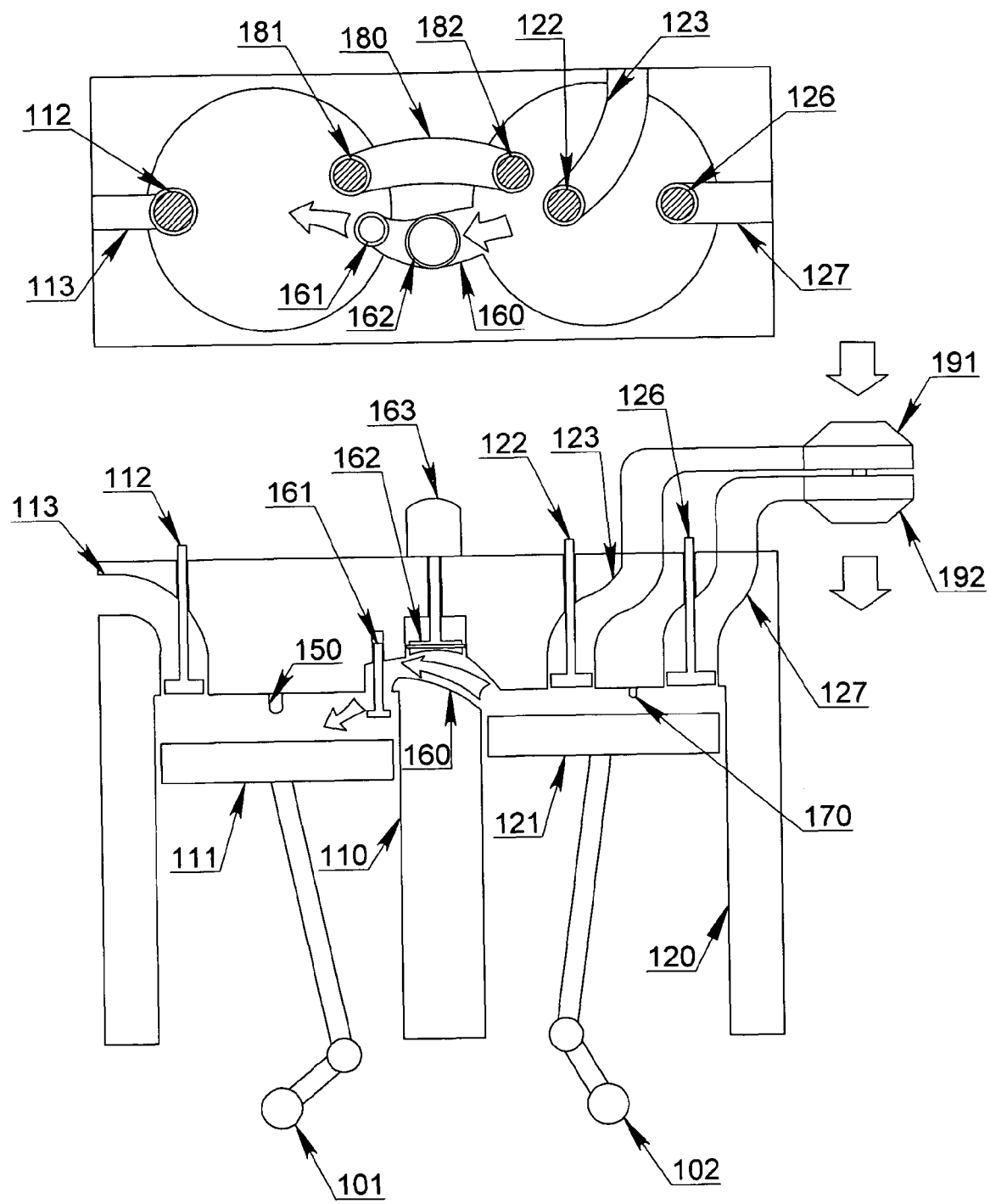
Figure 1G:
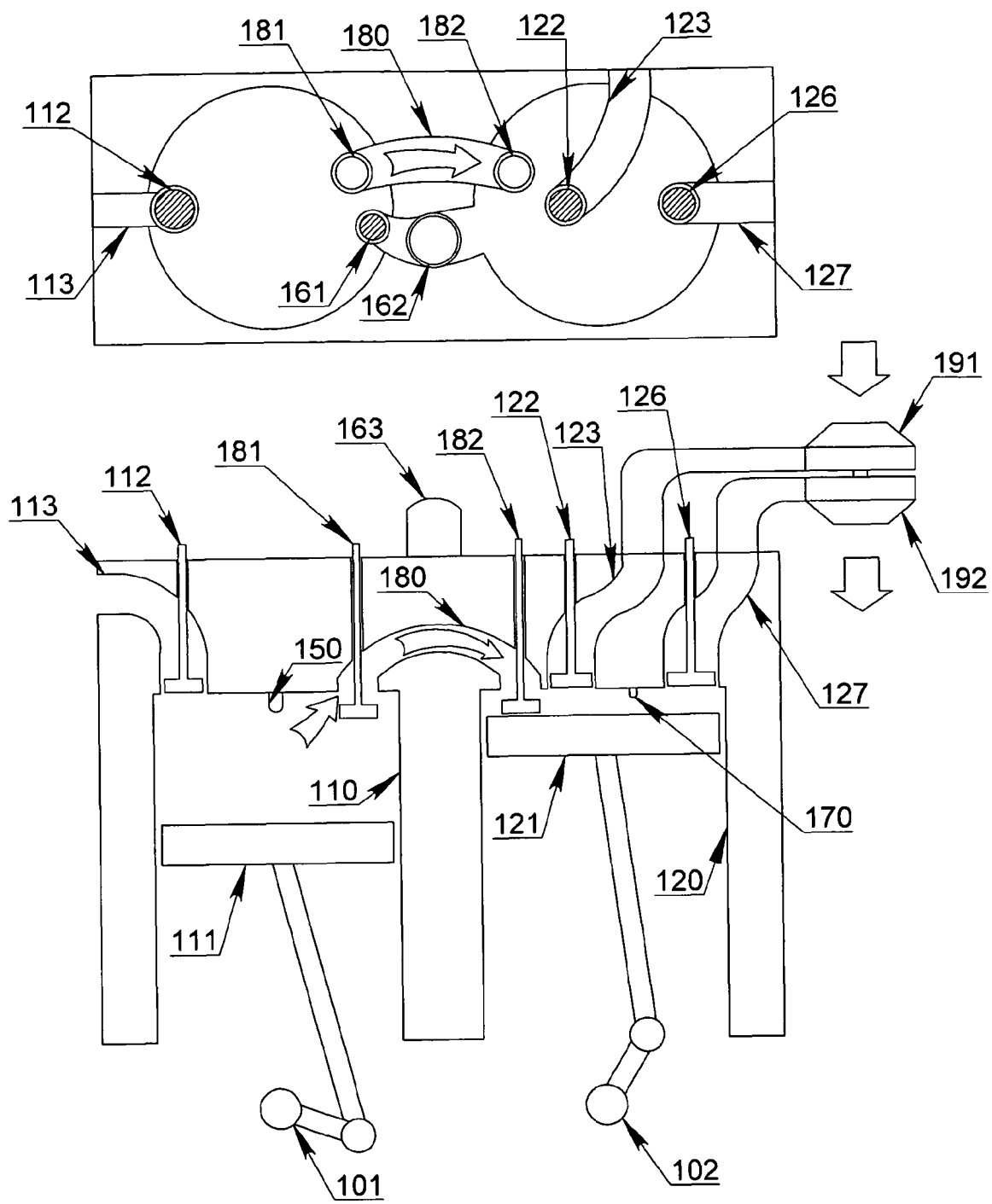
Figure 1H:
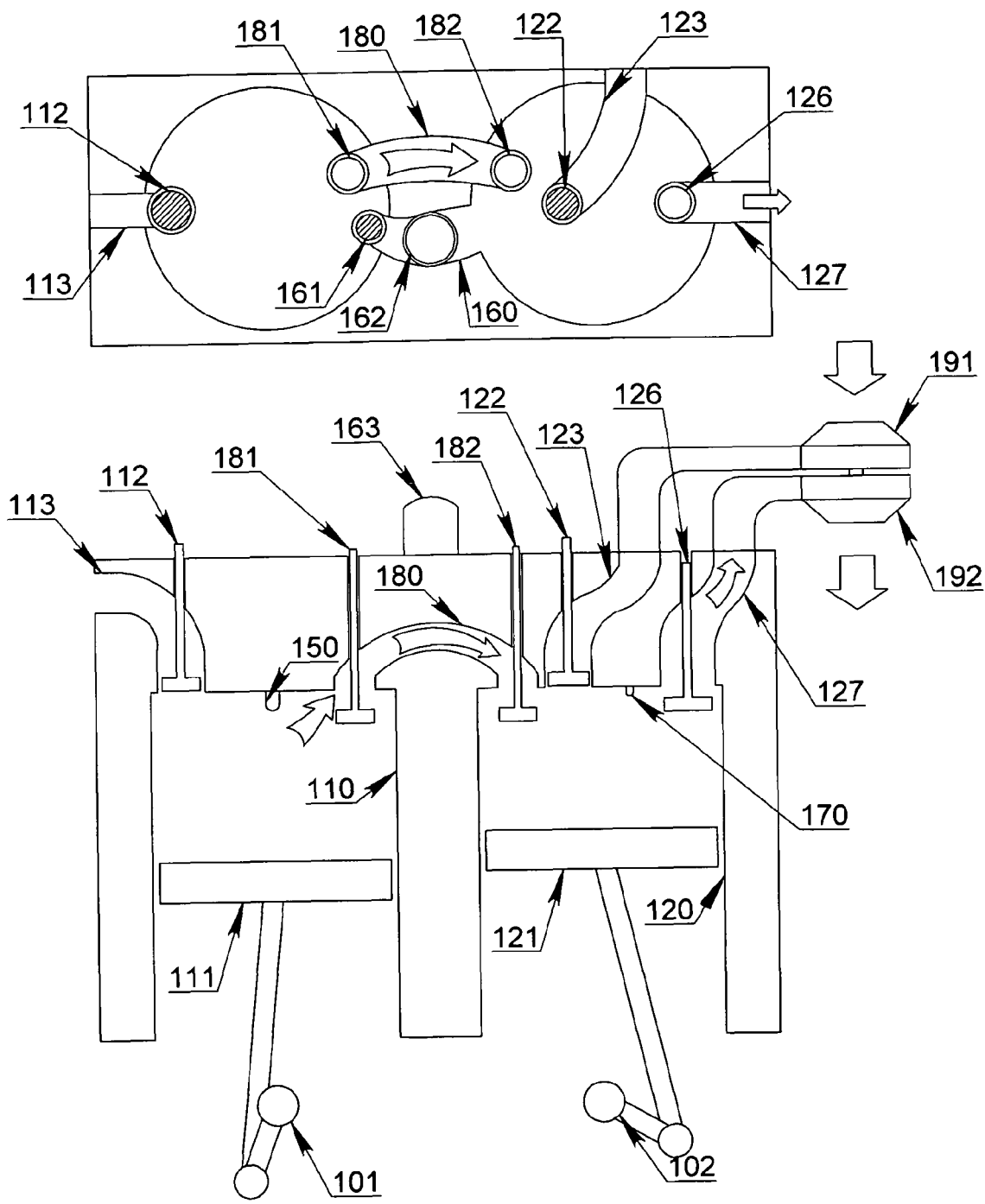

The master cylinder 110 will take in air during the master-intake-process with the master-intake-valve 112 as in FIG. 1A; the slave cylinder 120 will take in air during the slave-intake-process with slave-intake-valve 122 as shown in FIG. 1B; the master cylinder 110 will compress the air therein during the master-compression-process as in FIG. 1C; the slave cylinder 120 will compress the air into the charge-coordinate-channel 160 during the slave-compression-process as in FIG. 1D; the master cylinder 110 will ignite an air-fuel mixture in the master cylinder 110 during the hot-combustion-process as in FIG. 1E; a flow of high-density-air is injected into the master cylinder 110 from the charge-coordinate-channel 160 during the injection-process as in FIG. 1F; a cold-expansion-medium will expand in both the master cylinder 110 and the slave cylinder 120 through the reverse-channel 180 during the cold-expansion-process as in FIG. 1G; the cold-expansion-medium will be expelled out of the slave cylinder 120 during the slave-exhaust-process as in FIG. 1H.

During the light load operation of the first embodiment, the volume-control actuator 163 adjusts the buffer piston 162 (volume-control member) to the lowest position as shown in FIG. 1.L*ight*, the charge-coordinate-channel 160 will have the relatively smallest volume, therefore, as the slave piston 121 moves up during the slave-compression-stroke, the pressure of the high-density-air in the charge-coordinate-channel 160 is increased over the combustion pressure of the master cylinder at 390 degree of crankshaft reference angle, thereby initiating the injection-process by opening the charge-coordinate-valve 161 at 390 degree of crankshaft reference angle as shown in Operation Table.1L.

During the medium load operation of the first embodiment, the volume-control actuator 163 lifts the buffer piston (volume-control member) to a relatively higher position as shown in FIG. 1.M*edium*, the charge-coordinate-channel 160 will have more effective volume than that of the light load operation, therefore, as the slave piston 121 moves up during the slave-compression-stroke, the pressure of the high-density-air is increased relatively slower due to the bigger effective volume in the charge-coordinate-channel 160, and the pressure of the high-density-air is then increased to over the combustion pressure of the master cylinder at 410 degree of crankshaft reference angle, thereby initiating the injection-process by opening the charge-coordinate-valve at 410 degree of crankshaft reference angle as shown in Operation Table.1M.

During the heavy load operation of the first embodiment, the volume-control actuator 163 lifts the buffer piston 162 (volume-control member) to the highest position as shown FIG. 1.H*eavy*, the charge-coordinate-channel 160 will have the maximum possible effective volume, therefore, as the slave piston 121 moves up during the slave-compression-stroke, the pressure of the high-density-air is eventually increased to over the combustion pressure of the master cylinder 110 at 420 degree of crankshaft reference angle, thereby initiating the injection-process at 420 degree of crankshaft reference angle as shown in Operation Table.1H.

Now comparing with the conventional eight-stroke engine in the heavy load operation, assuming the air of the slave cylinder is compressing to about 1/40 of its original volume in the conventional eight-stroke engine, the high-density-air of the charge-coordinate-channel is heated up to over 900 degree Celsius prior to the initiation point of the injection-process, even through the high-density-air will be injected into the master cylinder to form a cold-expansion-medium, wherein the hot-combustion-medium has a temperature of about 1200 degree Celsius at the initiation point of the injection-process, the cold-expansion-medium will then be formed at about 1000 degree Celsius, the cooling effect will be significantly reduced due to the high temperature characteristic of the high-density-air, and an excessive energy loss will be caused by the slave-compression-process.

For the present invention, the effective volume of the charge-coordinate-channel 160 will be adjusted according to the combustion condition of master cylinder 110 and the compression condition of the slave cylinder 120, now assuming that the effective volume of the charge-coordinate-channel can be adjusted to 1/40 of the slave cylinder volume in the light load operation and 1/10 of the slave cylinder volume in the heavy load operation, the high-density-air is compressed to about 400 degree Celsius prior to the initiation of the injection-process in the heavy load operation, wherein the hot-combustion-medium is at about 1200 degree Celsius at the initiation point of the injection-process, so a cold-expansion-medium will be formed at a relatively lower temperature (about 600 degree to 800 degree Celsius) than that of the conventional eight-stroke engine, in addition the excessive energy loss is prevented, thereby achieving a fuel efficiency of 35% for gasoline type eight-stroke engine and 45% for diesel type eight-stroke engine.

In all of the abovementioned load conditions of the first embodiment, the ECU will compute the required effective volume of the charge-coordinate-channel for regulating the maximum compression pressure of the slave cylinder (the pressure of the high-density-air at the initiation of the injection process) within 75% to 25% of the maximum concurrent combustion pressure of the master cylinder. For the configuration with a turbocharger system or a supercharger system to boost the intake pressure of the slave cylinder, a slave-pressure-sensor is required to assist the ECU to compute the correct target position of the buffer piston.

The charge-coordinate-valve 161 can be actuated with various actuation mechanisms as long as the charge-coordinate-valve 161 is actuated after the air-pressure of the charge-coordinate-channel 160 has increased to over the pressure of the master cylinder 110; wherein said actuation mechanisms can be a servo motor, a hydraulic actuator, a variable timing camshaft system, or a spring actuator.

The first embodiment can also employ more than one charge-coordinate-channel and charge-coordinate-valve, wherein each charge-coordinate-channel can have an individual volume-control member to regulate the maximum compression pressure within 25% to 75% of the concurrent maximum combustion pressure.

Now referring to FIG. 2A to FIG. 2D for the second embodiment, the second embodiments includes a master cylinder 210, a slave cylinder 220, a master piston 211, a slave piston 221, a master crankshaft 201, a slave crankshaft 202, a master-intake-valve 212, a slave-intake-valve 222, a slave-exhaust-valve 226, a master-intake-port 213, a slave-intake-port 223, a slave-exhaust-port 227, a charge-coordinate-channel 260, a reverse-channel 280, a charge-coordinate-valve 261, a reverse-input-valve 281, a reverse-output-valve 282, a spring-buffer-piston 262 (also referred as an volume-oscillating-member for the ease of comprehension, various other shapes can be constructed with the same concept), a compressor 291 of the turbocharger, a turbine 292 of the turbocharger, a slave-pressure-sensor 270, a spark plug 250 (as the ignition means for the master cylinder); wherein the charge-coordinate-valve 261 can only be actuated after the air-pressure of the charge-coordinate-channel 260 is increased to higher than the pressure in the master cylinder 210; wherein and the reverse-input-valve 281 and the reverse-output-valve 282 can only be actuated after the slave-expansion-stroke has started; wherein the compression pressure in the charge-coordinate-channel 260 will be regulated within 75% to 25% of the concurrent maximum combustion pressure of the master cylinder 210.

The 8-process-sequence performed with the second embodiment are the basically the same as that of the first embodiment, wherein the Operational Table.1M can also be used a reference to the following explanation.

Figure 2A:
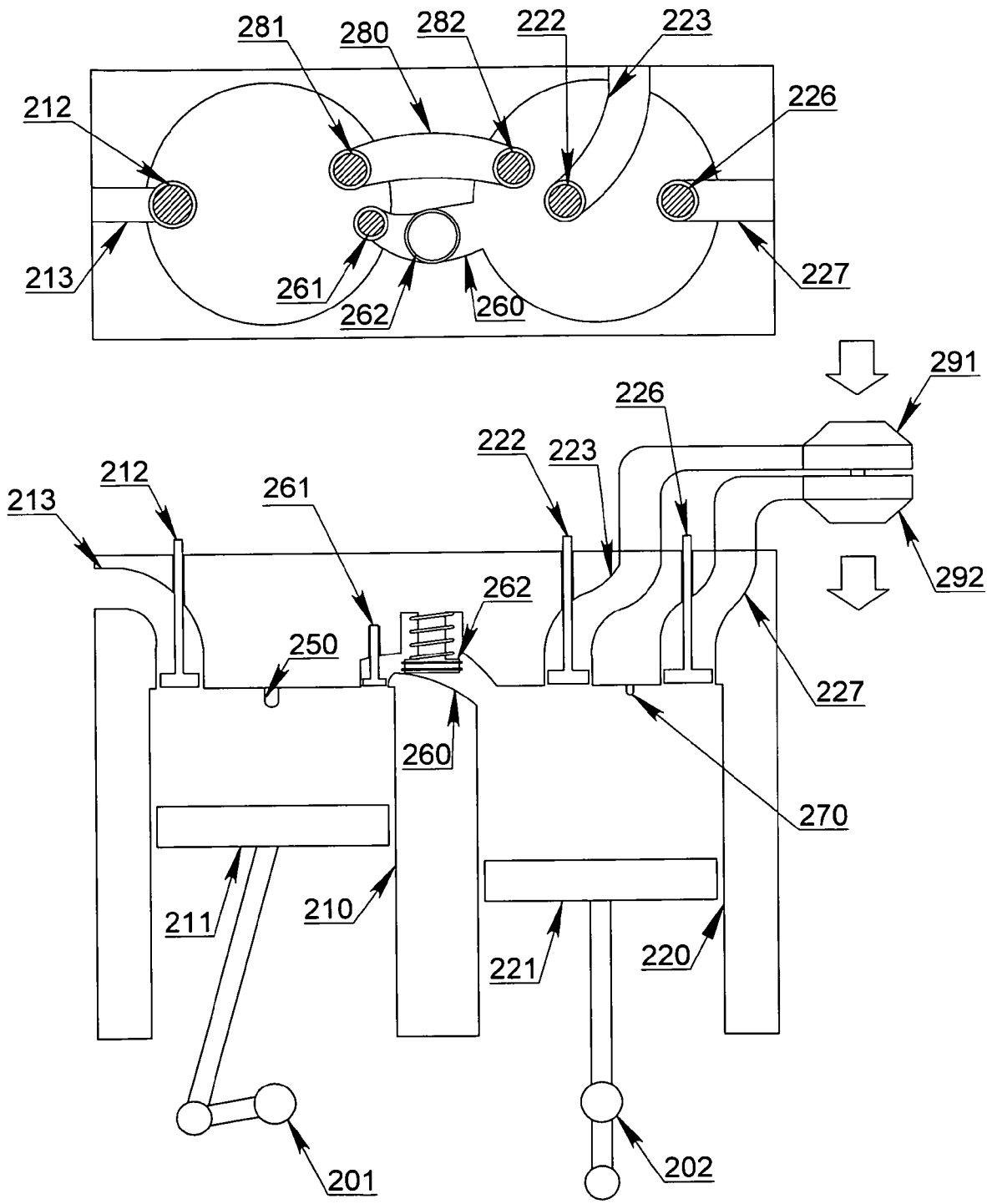
FIG. 2A to FIG. 2D demonstrates the operation of the volume-oscillating-member of the second embodiment; wherein the master piston and the slave piston are configured with 80 degree phase-difference.

For the second embodiment as shown in FIG. 2A to FIG. 2D, the basic concept is the same, except the effective volume of the charge-coordinate-channel 260 is controlled with a spring-buffer-piston 262, wherein said spring-buffer-piston 262 will oscillate its position along with the compression pressure in the charge-coordinate-channel 260; the cylinder conditions is explained as follows:

Referring to FIG. 2A, the eight-stroke engine is at the end of the slave-intake-process at about 260 degree of crankshaft reference angle, as the slave cylinder 220 has not started the compressing the air, the pressure in the charge-coordinate-channel 260 is still low (assuming the pressure now is at 20 psi), the spring-buffer-piston 262 is then at its lowest position.

Figure 2B:
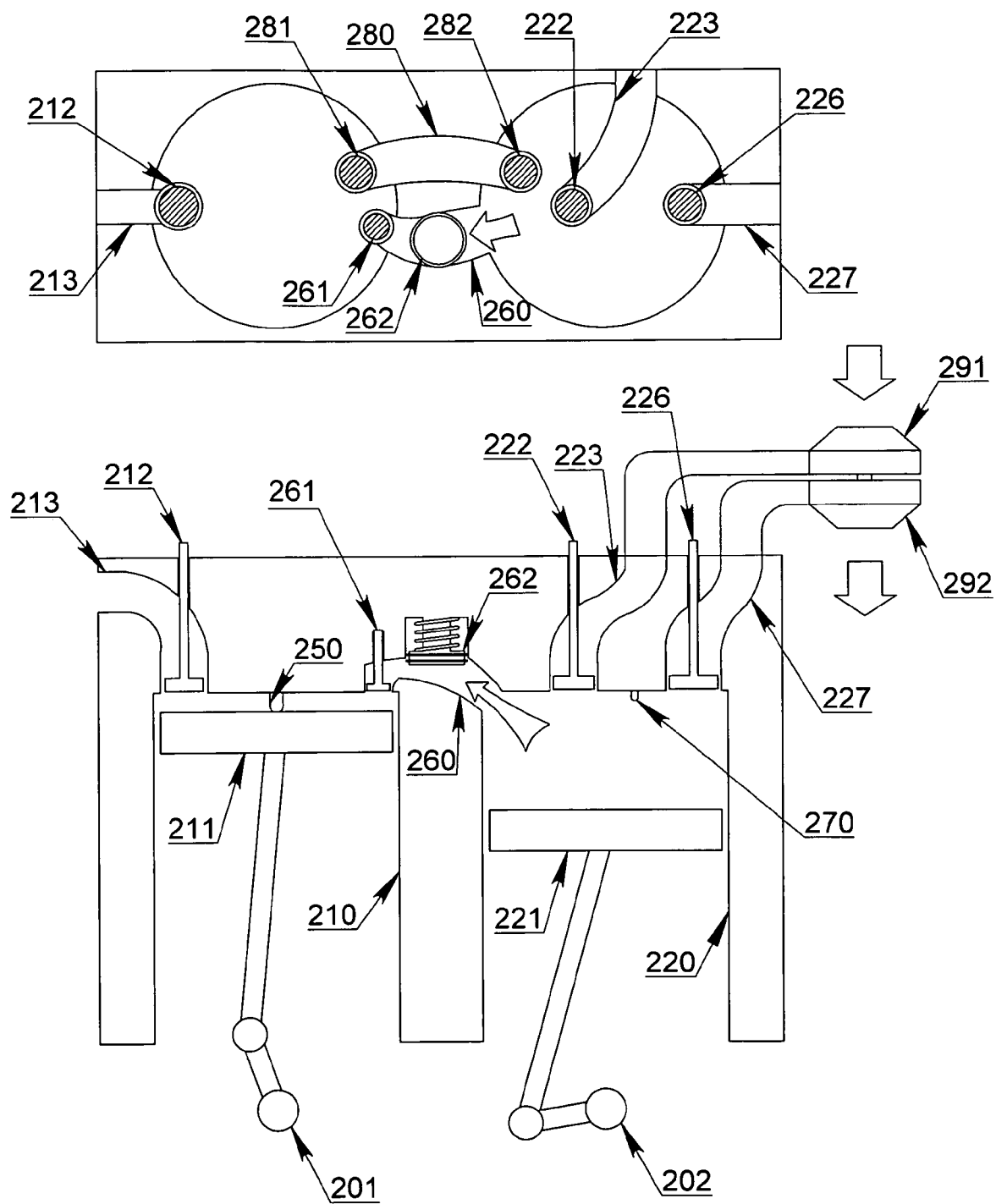

Referring to FIG. 2B, the eight-stroke engine is in the middle of the slave-compression-process at about 340 degree of crankshaft reference angle, as the pressure in the charge-coordinate-channel 260 will increase as the slave piston 221 reciprocates up toward the TDC position (assuming the pressure now is at 40 psi), the spring-buffer-piston 262 is pushed up with the compressed air.

Figure 2C:
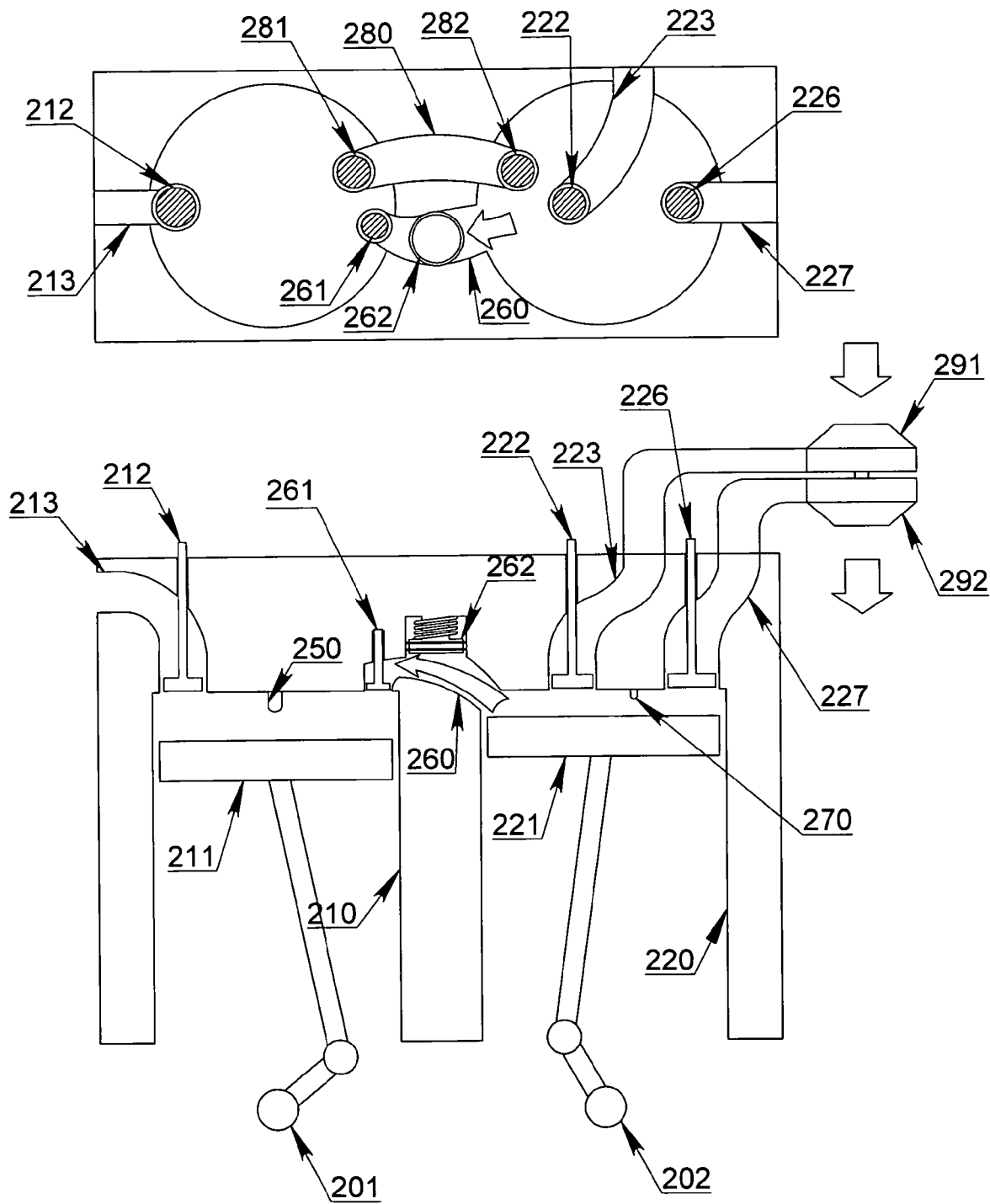

Referring to FIG. 2C, the eight-stroke engine is at the end of the slave-compression-process at about 410 degree of crankshaft reference angle, the spring-buffer-piston 262 is pushed up according to the air-pressure in the charge-coordinate-channel 260 (assuming the pressure now is at 300 psi), and the charge-coordinate-valve 261 is about to be opened to initiate the injection-process; during the next 30 degree of crankshaft rotation, the high-density-air of the charge-coordinate-channel 260 is injected into the master cylinder 210 to mix with the hot-combustion-medium.

Figure 2D:
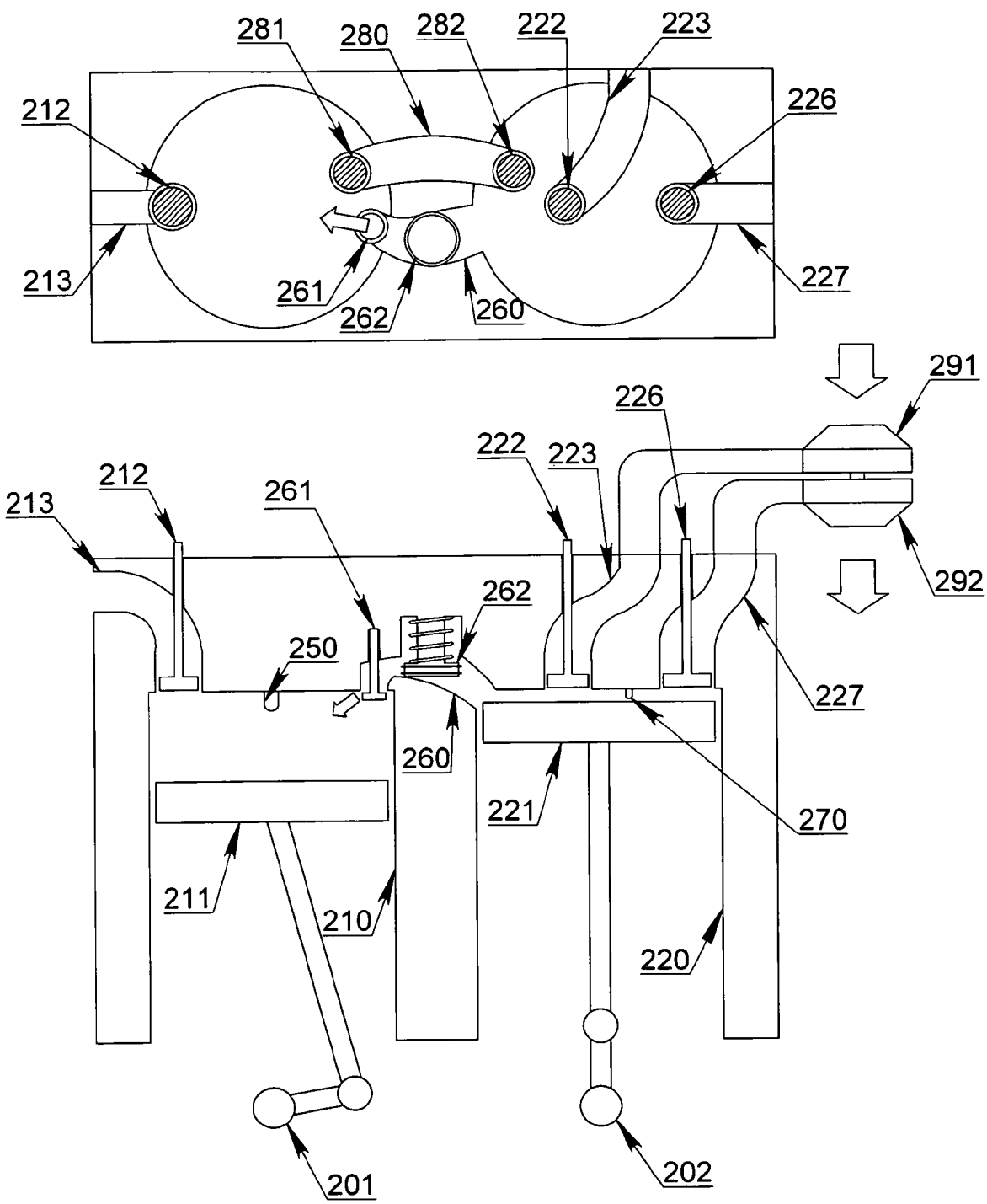

Referring to FIG. 2D, the eight-stroke engine has just finished the injection-process at about 440 degree of crankshaft reference angle, the spring-buffer-piston 262 will oscillate down as the high-density-air has been injected into the master cylinder 210 (assuming the pressure now has dropped to 50 psi since the charge-coordinate-valve 261 is shut and the slave piston 221 starts to reciprocate downward, the reverse-input-valve 281 and the reverse-output-valve 282 are about to open to initiate the cold-expansion-process).

As the load increases for the eight-stroke engine in the second embodiment, the spring-buffer-piston 262 will be pushed up to a relatively higher position to provide a relatively bigger effective volume in the charge-coordinate-channel 260, thereby regulating the maximum compression pressure of the slave cylinder 220 within 25% to 75% of the concurrent maximum combustion pressure of the master cylinder 210.

A spring-tension-adjustor can be installed in the engine head for adjusting the spring tension of the spring-buffer-piston for a wider operational load range with the second embodiment; since the eight-stroke engine generally requires an intake-charger system (such as turbocharger or supercharger) to boos the intake pressure of the slave cylinder, a slave pressure sensor 270 can also be installed in the slave cylinder 220 or the charge-coordinate-channel 260 to provide the information required to adjust said spring-tension-adjustor of the spring-buffer-piston 262 in the second embodiment.

The charge-coordinate-valve 261 can be actuated with various actuation mechanisms as long as the charge-coordinate-valve 261 is actuated after the air-pressure of the charge-coordinate-channel 260 has increased to over the pressure of the master cylinder 210; wherein said actuation mechanisms can be a servo motor, a hydraulic actuator, a variable timing camshaft system, or a spring actuator.

The eight-stroke engine of the present invention can be configured with various cylinder arrangements, the master piston and the slave-piston can be connected with single crankshaft or two separate crankshafts coupled to synchronize the rotation speed with gears.

Figure 5:
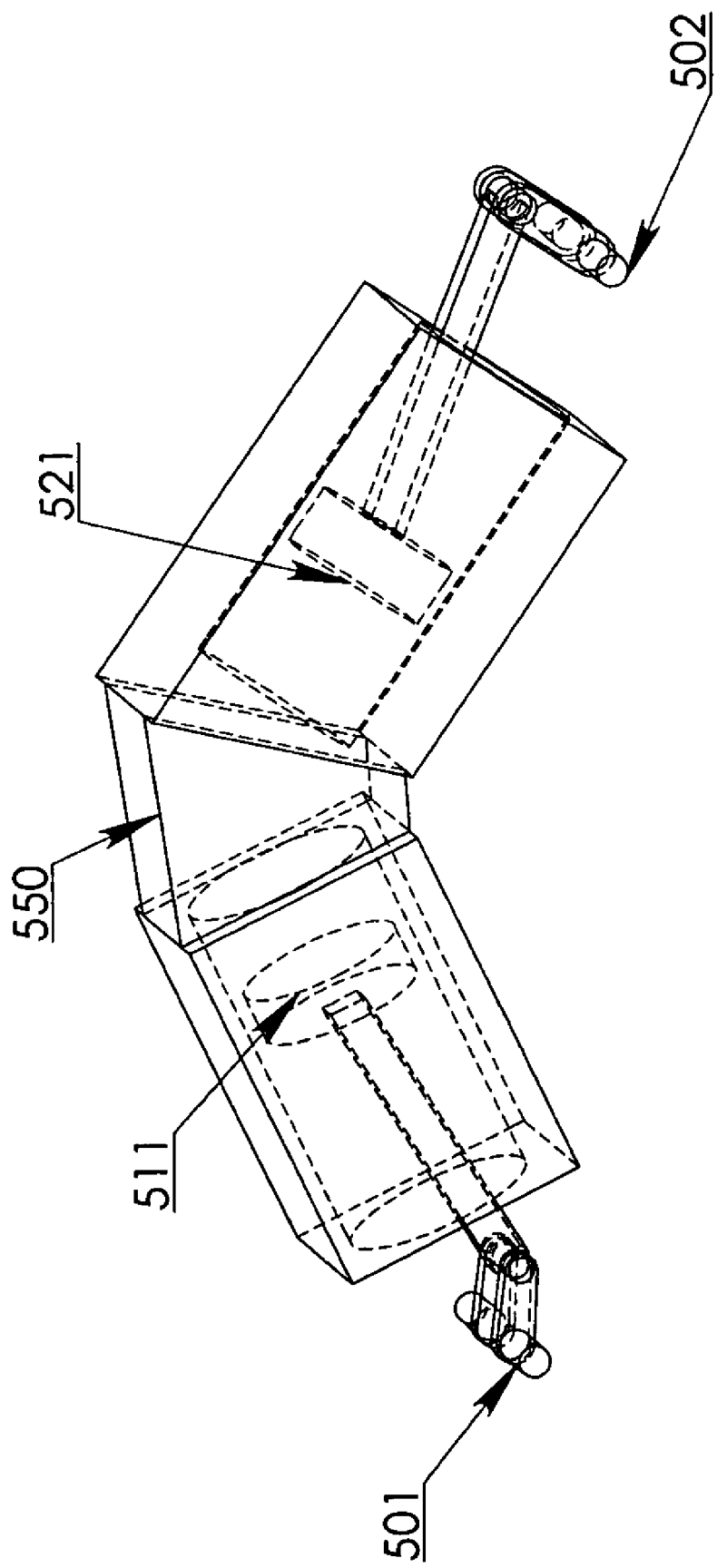
FIG. 5 demonstrates another alternative cylinder arrangement of the eight-stroke engine, wherein an inline block of the master cylinder and an inline block of the slave cylinder are connected at an angle to construct as an A-type cylinder arrangement.

An example of the possible cylinder arrangements is to dispose master cylinder and the slave cylinder so that the master piston 511 and the slave piston 521 reciprocate towards each other as in the A-type cylinder arrangement shown in FIG. 5, wherein the cold-expansion-medium can expand with less pumping loss; the components are labeled as the master piston 511, the slave piston 521, the engine head 550 (consists of all required valves and channels and ports), the master crankshaft 501, the slave crankshaft 502.

Figure 4:
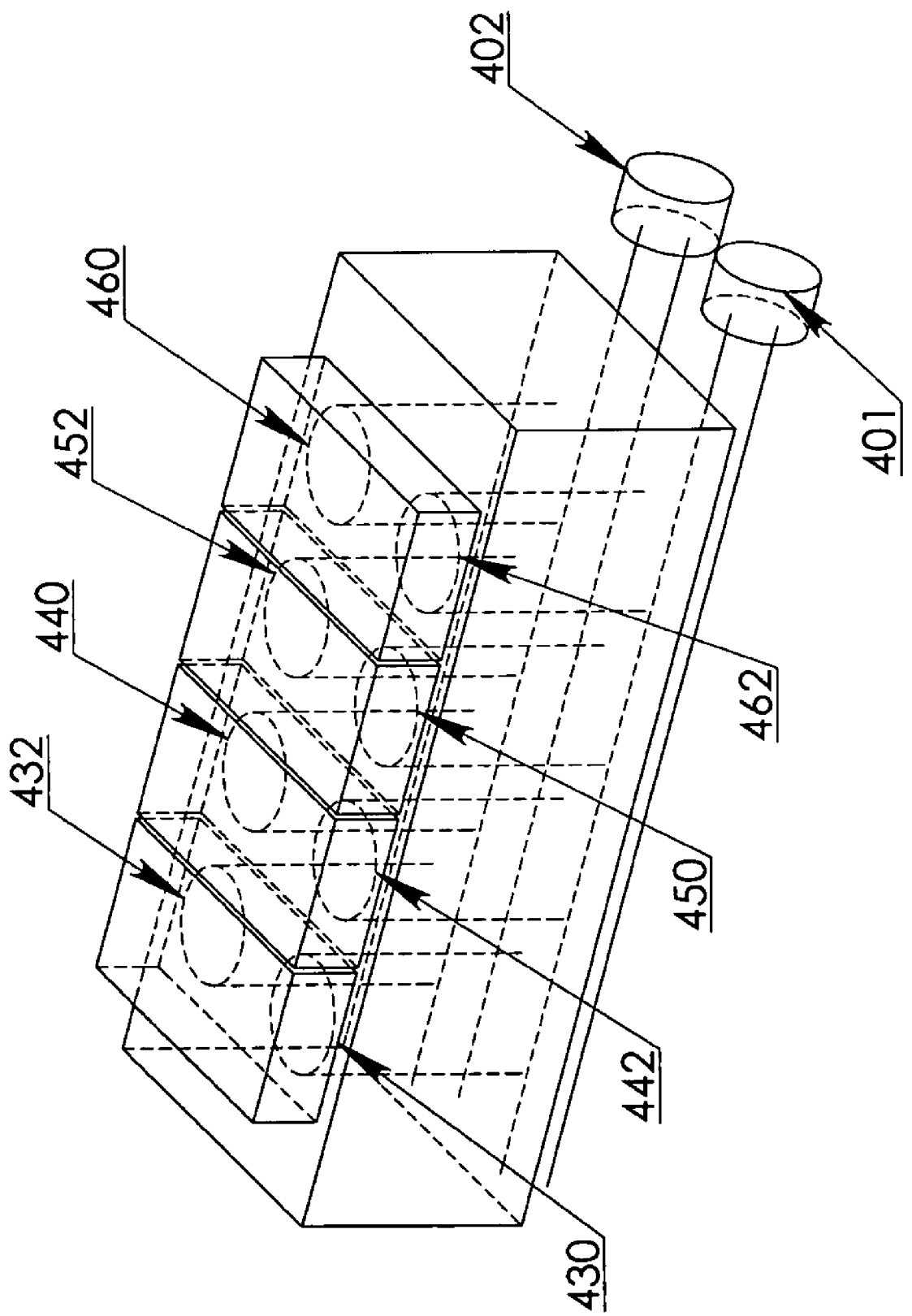
FIG. 4 demonstrates an alternative cylinder arrangement of the eight-stroke engine, wherein the master cylinder and the slave cylinder are connected to a first crankshaft and a second crankshaft in alternating order.

Another example of the cylinder arrangements is shown in FIG. 4, wherein the master cylinder and the slave cylinder are connected to the first crankshaft and the second crankshaft in alternating order, wherein, the first master cylinder 430 is co-acting with the first slave cylinder 432, the second master cylinder 440 is co-acting with the second slave cylinder 442, the third master cylinder 450 is co-acting with the third slave cylinder 452, the fourth master cylinder 460 is co-acting with the fourth slave cylinder 462; the first master cylinder 430 and the third master cylinder 450 is connected to the first crankshaft 401, the second master cylinder 440 and the fourth master cylinder 460 is connected to the second crankshaft 402, whereas the first slave cylinder 432 and the third slave cylinder 452 is connected to the second crankshaft 402, the second slave cylinder 442 and the fourth slave cylinder 462 is connected to the first crankshaft 401.

Figure 1I:
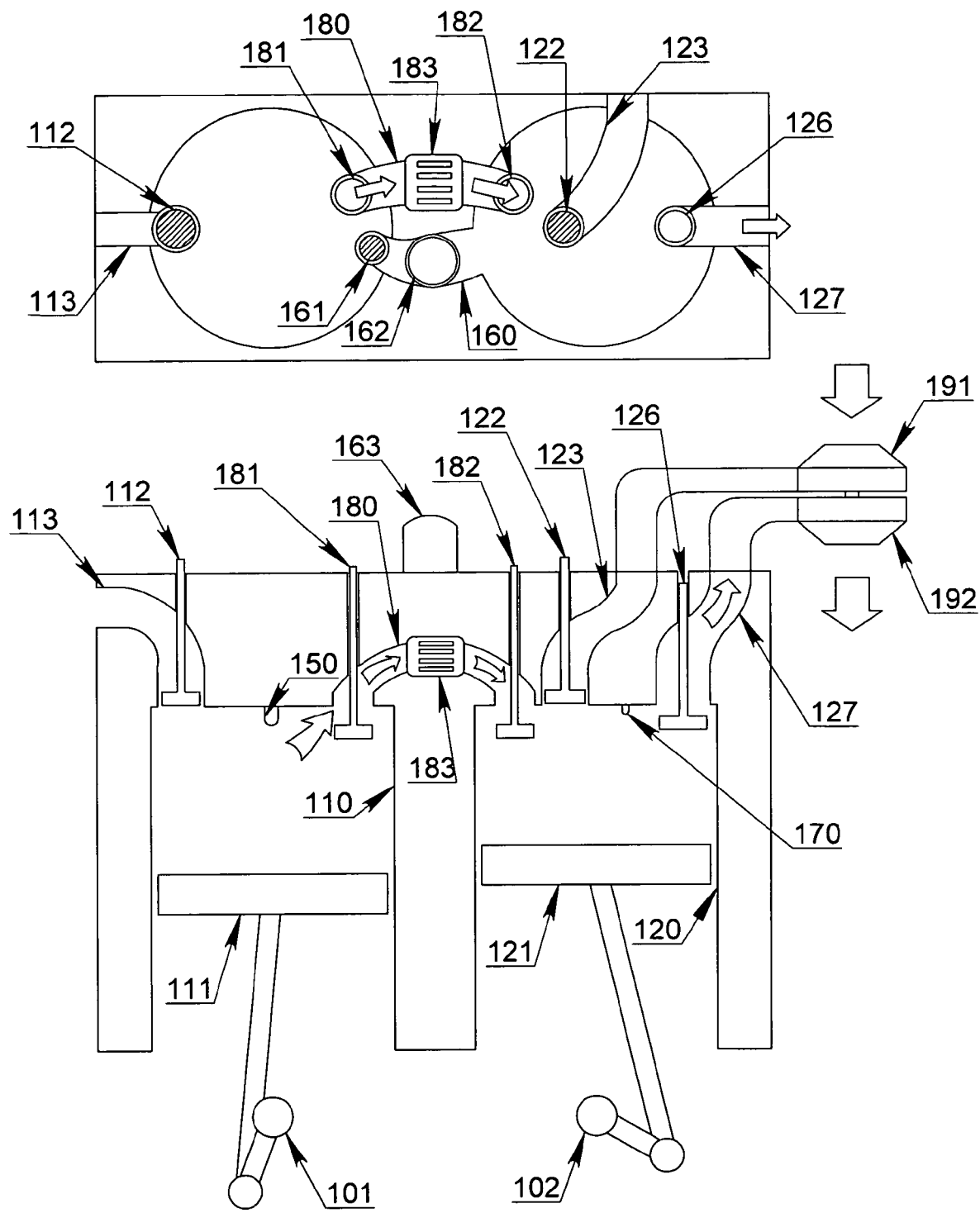
FIG. 1I shows an eight-stroke engine with a built-in catalytic converter, wherein the cold-expansion-medium will pass through the catalytic converter before entering the slave cylinder, thereby increasing the expansion efficiency of the cold-expansion-process and reducing the pollution in the light load operation.

A catalytic converter can be included in the reverse-channel for both the first embodiment and the second embodiment; an example is shown in FIG. 1I (the eight-stroke engine is in beginning of the cold-expansion-process), wherein the cold-expansion-medium of the master cylinder 110 will pass through the catalytic converter 183 before entering the slave cylinder 120.

Figure 3:
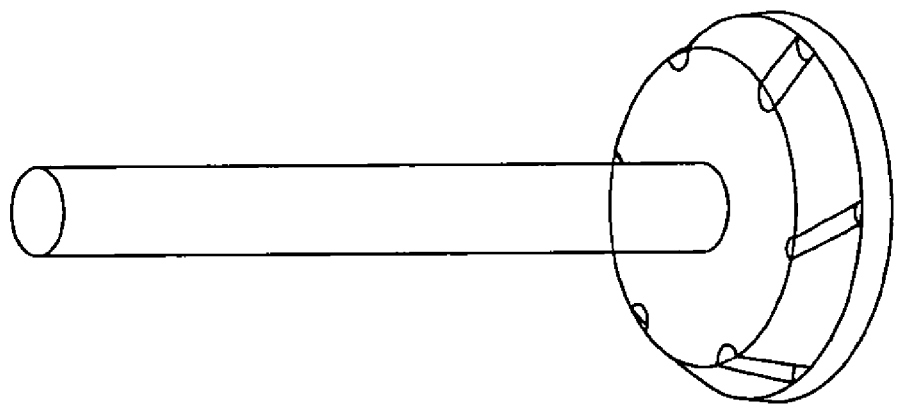
FIG. 3 demonstrates a charge-coordinate-valve constructed with air-guiding-grooves to improve the cooling effect of the injection-process.

The charge-coordinate-valve is preferable to be constructed with air-guiding-grooves as shown in FIG. 3 to improve the cooling effect of the injection-process.

Figure 6:
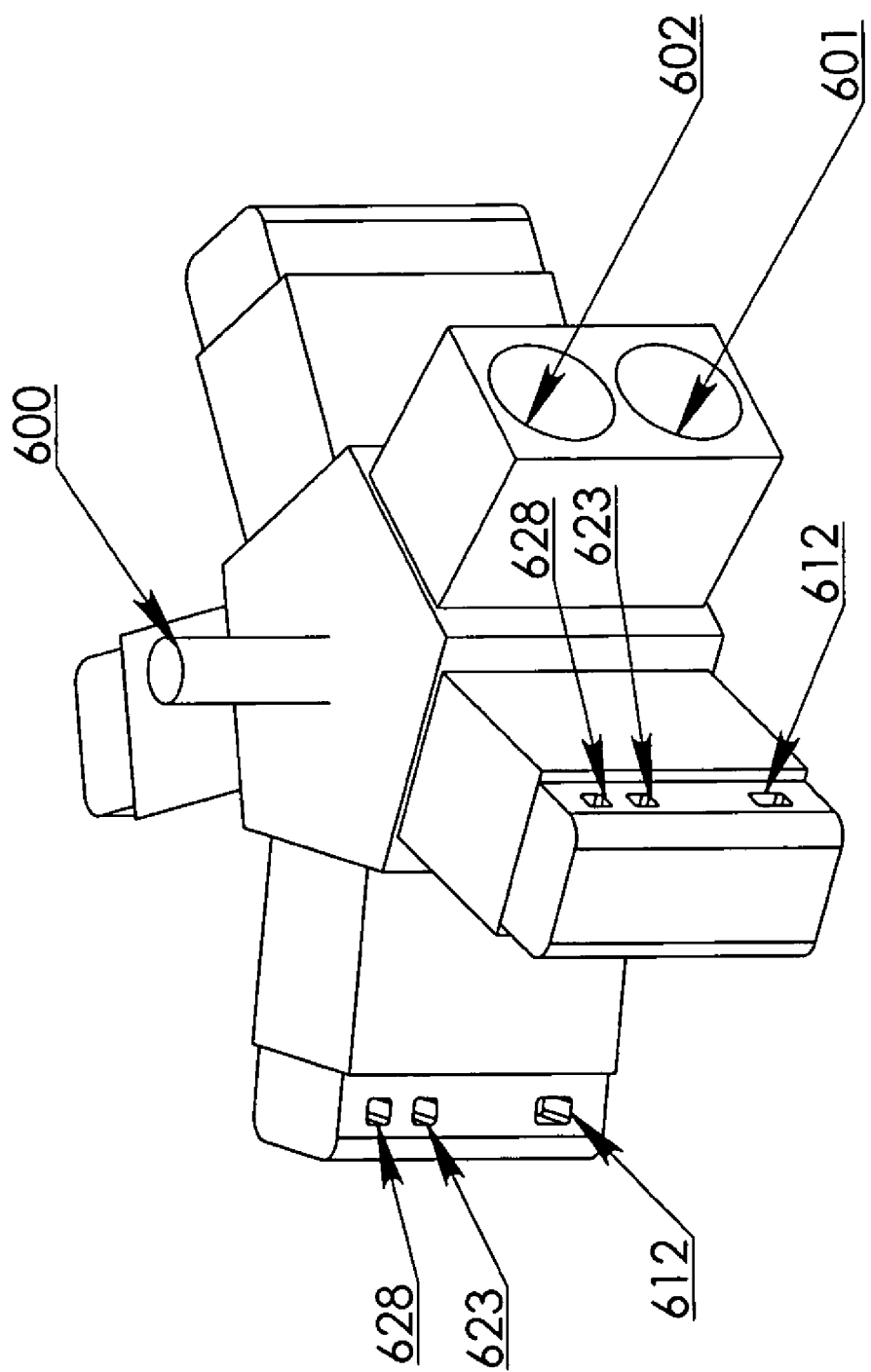
FIG. 6 demonstrates another alternative cylinder arrangement of the eight-stroke engine, the radial type eight-stroke engine.

An example of the radial type eight-stroke engine is demonstrated in FIG. 6, wherein 5 sets of master cylinders 601 and slave cylinders 602 are arranged in radial configuration to share the crankshaft 600; the components are labeled as the crankshaft 600, the master cylinder 601, the slave cylinder 602, the master-intake-port 612, the slave-intake-port 623, the slave-exhaust-port 628.

The fuel type of the eight-stroke engine of the present invention can be gasoline, diesel, natural gas, methanol with corresponding fuel supplying means and ignition means.

The initiation point (ignition) of the hot-combustion-process can be set between the last 35 degree of the master-compression-stroke and the first 40 degree of the master-expansion-stroke; in other words, the ignition timing of the master cylinder can be set between 35 degree before the TDC of the master-compression-stroke and the 40 degree after the TDC of the master-expansion-stroke; wherein the injection-process should only be initiated after the hot-combustion-process has commenced over 15 degree of crankshaft rotation.

The phase-difference between the master piston and the slave piston can be adjusted from 60 degree to 150 degree to perform the eight-stroke-operation; Operation Table.2M provides an example of the eight-stroke-operation for the configuration of 120 degree phase-difference.

OPERATION TABLE 1L

Eight-stroke-operation with buffer-piston in light load operation (80 degree phase-difference)

| Master Cylinder | 1st* | | 3rd* | | 5th* | 6th* | 7th* | | 8th* | | 1st* |
|---|---|---|---|---|---|---|---|---|---|---|---|
| | master-intake-stroke | | master-compression-stroke | | | | master-expansion-stroke | | master-exhaust-stroke | | |

| Slave Cylinder | 8th* | 2nd* | | 4th* | | 6th* | 7th* | | 8th* | |
|---|---|---|---|---|---|---|---|---|---|---|
| | | slave-intake-stroke | | slave-compression-stroke | | | slave-expansion-stroke | | slave-exhaust-stroke | |

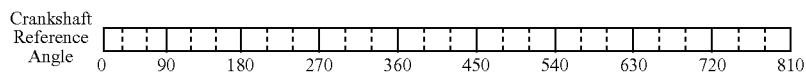

Crankshaft Reference Angle: 0 90 180 270 360 450 540 630 720 810

8-process-sequence note:

1st = the master-intake-process

2nd = the slave-intake-process

3rd = the master-compression-process

4th = the slave-compression-process

5th = the hot-combustion-process

6th = the injection-process

7th = the cold-expansion-process

8th = the slave-exhaust-process

OPERATION TABLE 1M

Eight-stroke-operation with buffer-piston in medium load operation (80 degree phase-difference)

| Master Cylinder | 1st* | | 3rd* | | 5th* | 6th* | 7th* | | 8th* | | 1st* |
|---|---|---|---|---|---|---|---|---|---|---|---|
| | master-intake-stroke | | master-compression-stroke | | | | master-expansion-stroke | | master-exhaust-stroke | | |

| Slave Cylinder | 8th* | 2nd* | | 4th* | | 6th* | 7th* | | 8th* | |
|---|---|---|---|---|---|---|---|---|---|---|
| | | slave-intake-stroke | | slave-compression-stroke | | | slave-expansion-stroke | | slave-exhaust-stroke | |

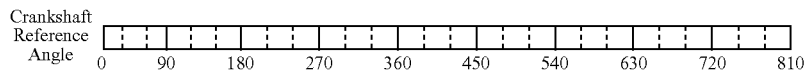

Crankshaft Reference Angle: 0 90 180 270 360 450 540 630 720 810

8-process-sequence note:

1st = the master-intake-process

2nd = the slave-intake-process

3rd = the master-compression-process

4th = the slave-compression-process

5th = the hot-combustion-process

6th = the injection-process

7th = the cold-expansion-process

8th = the slave-exhaust-process

OPERATION TABLE 1H

Eight-stroke-operation with buffer-piston in heavy load operation (80 degree phase-difference)

| Master Cylinder | 1st* | | 3rd* | | 5th* | 6th* | 7th* | 8th* | | 1st* |
|---|---|---|---|---|---|---|---|---|---|---|
| | master-intake-stroke | | master-compression-stroke | | master-expansion-stroke | | | master-exhaust-stroke | | |

| Slave Cylinder | 8th* | 2nd* | | 4th* | | 6th* | 7th* | | 8th* | |
|---|---|---|---|---|---|---|---|---|---|---|
| | | slave-intake-stroke | | slave-compression-stroke | | | slave-expansion-stroke | | slave-exhaust-stroke | |

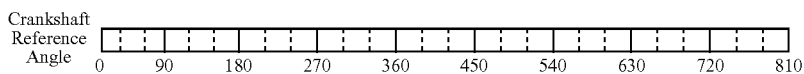

Crankshaft Reference Angle  0  90  180  270  360  450  540  630  720  810

8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process

OPERATION TABLE 2M

Eight-stroke-operation with buffer-piston in heavy load operation (120 degree phase-difference)

| Master Cylinder | 1st* | | 3rd* | | 5th* | 6th* | 7th* | 8th* | | 1st* |
|---|---|---|---|---|---|---|---|---|---|---|
| | master-intake-stroke | | master-compression-stroke | | master-expansion-stroke | | | master-exhaust-stroke | | |

| Slave Cylinder | 8th* | 2nd* | | 4th* | | 6th* | 7th* | | 8th* | |
|---|---|---|---|---|---|---|---|---|---|---|
| | | slave-intake-stroke | | slave-compression-stroke | | | slave-expansion-stroke | | slave-exhaust-stroke | |

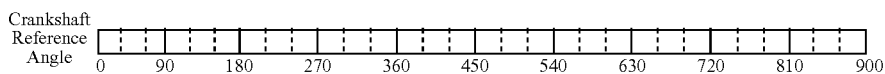

Crankshaft Reference Angle  0  90  180  270  360  450  540  630  720  810  900

8-process-sequence note:
1st = the master-intake-process
2nd = the slave-intake-process
3rd = the master-compression-process
4th = the slave-compression-process
5th = the hot-combustion-process
6th = the injection-process
7th = the cold-expansion-process
8th = the slave-exhaust-process

The invention claimed is:
1. A variable coordination volume type eight-stroke engine comprising:
a) a master cylinder (110) and a slave cylinder (120) for performing the eight-stroke-operation and the 8-process-sequence, wherein, said master cylinder (110) includes a master piston (111), said slave cylinder (120) includes a slave piston (121), wherein said master piston (111) and slave piston (121) are constructed with a phase-difference between 60 degree and 150 degree; said master cylinder (110) includes ignition means (150), fuel-supplying-mean, air-intake-means (112); said slave cylinder (120) includes air-intake-means (122), exhaust means (126);

b) a turbo-charger system connecting to the exhaust means (126) and the air-intake-means (122) of the slave cylinder (120), wherein a flow of cold-expansion-medium from the slave cylinder (120) will be charged to a turbine (192) of the turbo-charger system, thereby boosting the intake-pressure of the slave cylinder (120) with a flow of pressurized air from a compressor (191) of the turbo-charger system;

c) said eight-stroke-operation consists of the master-intake-stroke, the slave-intake-stroke, the master-compression-stroke, the slave-compression-stroke, the master-expansion-stroke, the slave-expansion-stroke, the master-exhaust-stroke and the slave-exhaust-stroke;

d) said 8-process-sequence consists of the master-intake-process, the slave-intake-process, the master-compression-process, the slave-compression-process, the hot-combustion-process, the injection-process, the cold-expansion-process, and the slave-exhaust-process;
e) a charge-coordinate-channel (160) and a reverse-channel (180) connecting between said master cylinder (110) and slave cylinder (120), wherein, said charge-coordinate-channel (160) provides an one-way flow passage from the slave cylinder (120) to the master cylinder (110) during the injection-process, said reverse-channel (180) provides an one-way flow passage from the master cylinder (110) to the slave cylinder (120) during the cold-expansion-process and the slave-exhaust-process;
f) a volume-control-member (162) and a volume-control-actuator (163) for adjusting the effective volume of said charge-coordinate-channel (160);
g) a engine control unit and sensor means (170) for controlling the volume-control-actuator (163) to regulate the air-pressure of said charge-coordinate-channel (160), wherein the air-pressure of said charge-coordinate-channel (160) will be regulated within 25% to 75% of the concurrent maximum combustion pressure of the master cylinder (110);
h) the master-intake-process is the process to provide air into the master cylinder (110) during the master-intake-stroke;
i) the slave-intake-process is the process to provide air into the slave cylinder (120) during the slave-intake-stroke;
j) the master-compression-process is the process to compress the air in the master cylinder (110) during the master-compression-stroke;
k) the slave-compression-process is the process to compress the air into the charge-coordinate-channel (160) as a high-density-air during the slave-compression-stroke;
l) the hot-combustion-process is the process to combust an air-fuel mixture as a hot-combustion-medium in the master cylinder (110) with said ignition means (150);
m) the injection-process is the process to inject the high-density-air of the charge-coordinate-channel (160) into the master cylinder (110) after the air-pressure of the charge-coordinate-channel (160) has increased to higher than the pressure of the hot-combustion-medium; during the injection-process, the hot-combustion-medium and the high-density-air is mixed in the master cylinder (110) to form a cold-expansion-medium;
n) the cold-expansion-process is the process to expand the cold-expansion-medium in both the master cylinder (110) and the slave cylinder (120), wherein, the cold-expansion-medium of the master cylinder (110) is transferred to the slave cylinder (120) through the reverse-channel (180);
o) the slave-exhaust-process is the process to expel the cold-expansion-medium out of the slave cylinder (120) with said exhaust means (126);
p) the initiation point of the injection-process can be set between 30 degree after the TDC of the master-expansion-stroke and 30 degree before the TDC of the slave-compression-stroke, and the minimum duration of the injection-process is 5 degree of crankshaft rotation.

2. A variable coordination volume type eight-stroke engine as defined in claim 1, wherein, said volume-control-member (162) is a buffer piston; said volume-control-actuator (163) can be a servo motor, a hydraulic actuator, a variable timing camshaft system, or a spring actuator.

3. A variable coordination volume type eight-stroke engine as defined in claim 2, wherein, said reverse-channel (180) includes a catalytic converter (185) to increase the efficiency of the cold-expansion-process and reduce pollution in light load operation.

4. A variable coordination volume type eight-stroke engine as defined in claim 2, wherein; said master cylinder (110) can include an auxiliary exhaust valve to expel the cold-expansion-medium out of the master cylinder (110) during the master-exhaust-stroke.

5. A variable coordination volume type eight-stroke engine comprising:
a) an eight-stroke engine operating with the 8-process-sequence, and said eight-stroke engine includes a master cylinder (110), a slave cylinder (120), a master piston (111), a slave piston (121), a master-intake-valve (112), a slave-intake-valve (122), a slave-exhaust-valve (126), a charge-coordinate-channel (160), a reverse-channel (180), a charge-coordinate-valve (161), a reverse-input-valve (181), a reverse-output-valve (182); wherein said master cylinder (110) includes fuel-supplying means and ignition means (150);
b) a volume-control-member (162) and a volume-control-actuator (163) and an engine control unit for controlling the effective volume of said charge-coordinate-channel (160);
c) the master piston (111) will perform the master-intake-stroke, the master-compression-stroke, the master-expansion-stroke, and the master-exhaust-stroke;
d) the slave piston (121) will perform the slave-intake-stroke, the slave-compression-stroke, the slave-expansion-stroke, and the slave-exhaust-stroke;
e) said 8-process-sequence operates in the order of the master-intake-process, the slave-intake-process, the master-compression-process, the slave-compression-process, the hot-combustion-process, the injection-process, the cold-expansion-process, the slave-exhaust-process;
f) the master-intake-process is to provide air into the master cylinder (110) with the master-intake-valve (112);
g) the slave-intake-process is to provide air into the slave cylinder (120) with the slave-intake-valve (122);
h) the master-compression-process is to compress the air in the master cylinder (110); wherein said fuel-supplying means will provide fuel into the master cylinder (110) during the master-intake-process or the master-compression-process to form an air-fuel mixture;
i) the slave-compression-process is to compress the air into the charge-coordinate-channel (160) as a high-density-air, wherein, the effective volume of the charge-coordinate-channel (160) is adjusted with said volume-control-member (162) to regulate the air-pressure therein;
j) the hot-combustion-process is to ignite the air-fuel mixture as a hot-combustion-medium in the master cylinder (110), wherein the initiation point of the hot-combustion-process can be set between the last 35 degree of the master-compression-stroke and the first 40 degree of the master-expansion-stroke;
k) the injection-process is to inject the high-density-air of the charge-coordinate-channel (160) into the master cylinder (110), wherein the pressure of the high-density-air must be higher than the pressure of the master cylinder (110) at the initiation of the injection-process, the hot-combustion-medium will be mixed with the high-density-air to form a cold-expansion-medium in the master cylinder (110) during the injection-process;
l) the cold-expansion-process is to generate power with the cold-expansion-medium in both the master cylinder (110) and the slave cylinder (120), wherein the reverse-channel (180) is open to provide a flow passage from the master cylinder (110) to the slave cylinder (120);

m) the slave-exhaust-process is to expel the cold-expansion-medium out of the slave cylinder (120) with the slave-exhaust-valve (126).

6. A variable coordination volume type eight-stroke engine as defined in claim 5, wherein, the duration of the injection-process can vary from 5 degree to 60 degree of crankshaft rotation, the initiation of the injection-process can be set between the first 30 degree of the master-expansion-stroke and the last 30 degree of the slave-compression-stroke; wherein said charge-coordinate-valve can be actuated with a servo motor, a hydraulic actuator, a variable timing camshaft system, or a spring actuator.

7. A variable coordination volume type eight-stroke engine as defined in claim 6, wherein, the air-pressure in the charge-coordinate-channel (160) during the slave-compression-process is regulated within 25% to 75% of the concurrent maximum combustion pressure by adjusting the effective volume of the charge-coordinate-channel (160).

8. A variable coordination volume type eight-stroke engine as defined in claim 7, wherein, the master cylinder can further include an auxiliary exhaust valve to expel the cold-expansion-medium out of the master cylinder during the master-exhaust-stroke.

9. A variable coordination volume type eight-stroke engine as defined in claim 7, wherein, said eight-stroke engine can further comprise a turbo-charger system for boosting the intake-pressure of the slave cylinder; wherein a slave-pressure-sensor (170) is installed in the slave cylinder (120) or the charge-coordinate-channel (160) for detecting the maximum compression pressure in the charge-coordinate-channel (160).

10. A variable coordination volume type eight-stroke engine as defined in claim 6, wherein; said reverse-channel (180) includes a catalytic converter (185) to increase the efficiency of the cold-expansion-process and reduce pollution in the light load operation.

11. A variable coordination volume type eight-stroke engine comprising:
   a) a master cylinder (210) and a slave cylinder (220) for performing the eight-stroke-operation and the 8-process-sequence; said master cylinder (210) includes fuel-supplying means, ignition means (250), air-intake-means (212); said slave cylinder (220) includes air-intake-means (222) and exhaust means (226);
   b) a master piston (211) reciprocating within said master cylinder (210) to perform the master-intake-stroke, the master-compression-stroke, the master-expansion-stroke, and the master-exhaust-stroke of the eight-stroke-operation;
   c) a slave piston (221) reciprocating within said slave cylinder (220) to perform the slave-intake-stroke, the slave-compression-stroke, the slave-expansion-stroke, the slave-exhaust-stroke of the eight-stroke-operation; wherein said master piston (211) and slave piston (221) has a phase-difference between 60 degree and 150 degree;
   d) said 8-process-sequence consists of the master-intake-process, the slave-intake-process, the master-compression-process, the slave-compression-process, the hot-combustion-process, the injection-process, the cold-expansion-process, the slave-exhaust-process;
   e) a charge-coordinate-channel (260) and a charge-coordinate-valve (261) for providing an one-way flow passage from the slave cylinder (220) to the master cylinder (210) during the injection-process, wherein, said charge-coordinate-valve (261) can only be actuated after the air-pressure of said charge-coordinate-channel (260) is higher than the pressure of the master cylinder (210);
   f) a volume-oscillating-member (262) for adjusting the effective volume of the charge-coordinate-channel (260) during the slave-compression-process, wherein the air-pressure of the charge-coordinate-channel (260) will be regulated within 25% to 75% of the concurrent maximum combustion pressure of the master cylinder (210) with said volume-oscillating-member (262);
   g) a reverse-channel (280) and a reverse-input-valve (281) and a reverse-output-valve (282) for providing a one-way flow passage from the master cylinder (210) to the slave cylinder (220) during the cold-expansion-process.

12. A variable coordination volume type eight-stroke engine as defined in claim 11 further comprises a engine control unit and pressure sensor means for controlling the initiation timing of the injection-process, thereby regulating the maximum compression pressure of the slave cylinder (220) within 25% to 75% of the concurrent maximum combustion pressure of the master cylinder (210).

13. A variable coordination volume type eight-stroke engine as defined in claim 12, wherein; the initiation timing of the injection-process is controlled between the first 30 degree of the master-expansion-stroke and the last 30 degree of the slave-compression-stroke.

14. A variable coordination volume type eight-stroke engine as defined in claim 13, wherein; said volume-oscillating-member (262) is a spring-buffer-piston, and said spring-buffer-piston will be pushed up to increase the effective volume of said charge-coordinate-channel (260) during the slave-compression-process.

15. A variable coordination volume type eight-stroke engine as defined in claim 14 further comprises an spring-tension-adjustor to the adjust spring tension of said spring-buffer-piston.

16. A variable coordination volume type eight-stroke engine as defined in claim 14 further comprises an auxiliary exhaust valve to expel the air out of the master cylinder during the master-exhaust-stroke.

17. A variable coordination volume type eight-stroke engine as defined in claim 14, wherein; said reverse-channel (280) includes a catalytic converter to increase the efficiency of the cold-expansion-process and reduce pollution in the light load operation.

18. A variable coordination volume type eight-stroke engine as defined in claim 17 further comprises a turbo-charger system for boosting the intake pressure of slave cylinder during the slave-intake-process.

19. A variable coordination volume type eight-stroke engine as defined in claim 11, wherein; said charge-coordinate-valve (261) can be actuated with a servo motor, a hydraulic actuator, a variable timing camshaft system, or a spring actuator.

20. A variable coordination volume type eight-stroke engine as defined in claim 11, wherein; the master piston (211) and the slave-piston (221) are synchronized with two separate crankshafts to rotate at the same speed, wherein the phase-difference is set between 60 degree and 150 degree.

* * * * *